US008360889B2

(12) United States Patent
Narita et al.

(10) Patent No.: US 8,360,889 B2
(45) Date of Patent: Jan. 29, 2013

(54) GAME SYSTEM, GAME APPARATUS THEREFOR, COMMUNICATION APPARATUS THEREFOR, COMPUTER PROGRAM THEREFOR, AND DATA MANAGEMENT METHOD THEREFOR

(75) Inventors: Yoshihiko Narita, Tokyo (JP); Shinpei Makino, Tokyo (JP); Takashi Inubushi, Tokyo (JP); Yoshiko Oiwa, Tokyo (JP); Takahiro Ohashi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 790 days.

(21) Appl. No.: 12/520,012

(22) PCT Filed: Dec. 18, 2007

(86) PCT No.: PCT/JP2007/074291
§ 371 (c)(1),
(2), (4) Date: Jun. 18, 2009

(87) PCT Pub. No.: WO2008/075670
PCT Pub. Date: Jun. 26, 2008

(65) Prior Publication Data
US 2010/0048303 A1    Feb. 25, 2010

(30) Foreign Application Priority Data

Dec. 20, 2006  (JP) ................. 2006-343514

(51) Int. Cl.
*A63F 13/00*   (2006.01)
*A63F 9/24*   (2006.01)

(52) U.S. Cl. ............... 463/42; 463/16; 463/20; 463/25; 463/29

(58) Field of Classification Search ............ 463/16, 463/20, 25, 29, 40, 42; 273/138.1, 138.2, 273/143 R
See application file for complete search history.

(56) References Cited

U.S. PATENT DOCUMENTS
(Continued)

FOREIGN PATENT DOCUMENTS
EP   0 715 869 A1   6/1996
JP   H10-216358 A   8/1998
(Continued)

OTHER PUBLICATIONS

Taiwanese Office Action for Taiwanese Patent Application No. 096148996.

(Continued)

*Primary Examiner* — Dmitry Suhol
*Assistant Examiner* — Ryan Hsu
(74) *Attorney, Agent, or Firm* — Sughrue Mion, PLLC

(57) ABSTRACT

A game system (100) has plural game terminals (200) and a communication apparatus (300). The communication apparatus (300) receives an end notification indicating the end and a state of a play and stores a state data set (254) including a play data item indicating a result of the play and a time data item indicating a point in time corresponding to a point in time at which the end notification was received. The game terminal (200), by transmitting a state request, receives a state data set (254) stored in the communication apparatus (300) at that point in time and reads a play data item within the state data set after a delay period has passed since a point in time indicated by a time data item within the state data set, to output information corresponding to a state of a play indicated by the play data item.

17 Claims, 10 Drawing Sheets

U.S. PATENT DOCUMENTS

| | | | |
|---|---|---|---|
| 6,240,453 B1 * | 5/2001 | Chang et al. | 709/226 |
| 6,292,825 B1 * | 9/2001 | Chang et al. | 709/206 |
| 7,854,657 B2 * | 12/2010 | Shiraiwa | 463/42 |
| 2002/0151363 A1 * | 10/2002 | Letovsky et al. | 463/40 |
| 2002/0152120 A1 * | 10/2002 | Howington | 705/14 |
| 2003/0003997 A1 * | 1/2003 | Vuong et al. | 463/42 |
| 2003/0187736 A1 * | 10/2003 | Teague et al. | 705/14 |
| 2004/0002388 A1 * | 1/2004 | Larsen et al. | 463/43 |
| 2004/0087371 A1 | 5/2004 | Yamana et al. | |
| 2005/0282635 A1 | 12/2005 | Aoki | |

FOREIGN PATENT DOCUMENTS

| | | |
|---|---|---|
| JP | 2000-262743 A | 9/2000 |
| JP | 2001-198363 A | 7/2001 |
| JP | 2003-117246 A | 4/2003 |
| JP | P3496150 | 11/2003 |
| JP | 2006-6853 A | 1/2006 |
| JP | 2006-43439 A | 2/2006 |
| JP | 2006-280558 A | 10/2006 |
| JP | 2006-280562 | 10/2006 |
| TW | 200405191 A | 4/2004 |
| TW | I220498 | 8/2004 |

OTHER PUBLICATIONS

International Search Report issued Jan. 29, 2008 in International Application No. PCT/JP2007/074291.

Office Action from Japanese Patent Office in Japanese counterpart application No. 2006-343514, mailed Feb. 5, 2008 (with translation).

* cited by examiner

GAME SYSTEM, GAME APPARATUS THEREFOR, COMMUNICATION APPARATUS THEREFOR, COMPUTER PROGRAM THEREFOR, AND DATA MANAGEMENT METHOD THEREFOR

TECHNICAL FIELD

The present invention relates to a game system, a game apparatus therefor, a communication apparatus therefor, a computer program therefor, and to a data management method therefor.

BACKGROUND ART

There is disclosed in Japanese Patent Publication No. 3496150, a technique involving a network-type game system provided with plural game terminals, in which game system, plural plays (game plays) of match-up games can be performed simultaneously. In the game system, an event that has occurred in a match-up is reported to a player playing another match-up, whereby players currently participating in another play can be made aware of the existence of another player other than the opponent of the player. In this technique, when an event occurs at a game terminal of a player currently participating in a play, this event is reported to a specific communication apparatus (server apparatus), which then reports the event to another game terminal to be notified. A game terminal to be notified is decided by the specific communication apparatus based on the content of an event to be reported.

If the technique disclosed in Japanese Patent Publication No. 3496150 is to be implemented, it would be reasonable to use a push-based communication for notifying an event from a specific communication apparatus to a game terminal to be notified. In this case, the specific communication apparatus will have to centrally manage communication addresses of all potential game terminals that can be receivers of a notification. Accordingly, in a case in which the number of potential game terminals is large, i.e., in a case in which a large number of plays are performed simultaneously, the communication processing load at a specific communication apparatus will be excessive.

In the meantime, there is a network-type game system in which plural plays can be performed simultaneously, in which only one player participates in each play, and in which the result of each play is stored in a specific communication apparatus. Even in such a game system, it is important for a player currently participating in a play to be aware of the existence of other players. Accordingly, we now consider notifying each player participating in each play of the changes in states of plays in the overall game system. The changes in states of plays include, for example, a play having ended three minutes after the end of another play. In order to realize this, because it would be necessary to report the event of a play having ended to the game terminals of all players currently participating in all plays, the communication processing load at the specific communication apparatus will be excessive even if the technique described in Japanese Patent Publication No. 3496150 is used.

On the other hand, in a general network-type game system, a game terminal serves as a client, and a specific communication apparatus serves as a server, whereby a pull-based communication is performed. If a game system adopting this type of pull-based communication is used to implement the technique according to Japanese Patent Publication No. 3496150, a specific communication apparatus will no longer have to centrally manage a large number of communication addresses. However, in this mode, because a game terminal that can a receiver of a notification will never know of an event that has occurred at another game terminal nor the game terminal itself having changed to a terminal to be notified, the game terminal will have to access the specific communication apparatus at a predetermined interval. Therefore, in a case in which there are a large number of plays that are simultaneously performed, the communication processing load at a specific communication apparatus will be excessive. Also, because in this mode, time intervals of notifications for plural events are unlikely to coincide with time intervals of occurrences for the plural events, it will be difficult to inform a player participating in a play of the accurate transition in a state of a play in a game system.

DISCLOSURE OF INVENTION

Accordingly, the present invention has as an object to, in a network-type game system, enable the notification of the accurate transition in a state of a play in the game system without imposing excessive communication processing loads, the notification being made to a player who is currently participating in one of the plays.

Description will first be given of terms used in this specification.

A "game" is an activity involving some rules for determining a result of a play (game play). The "game" includes a multiple-player game in which two or more participant players or two or more participant teams compete or cooperate and a single player game in which a participant player plays a game to achieve an object or for enjoyment, i.e., a one-person game, and a puzzle. In this specification, there is disclosed a single player game as an example of a game. However, the present invention is not limited to an embodiment of a single player game but encompasses all other types of games. A multiple-player game includes an individual-evaluation type game in which a result of each play is determined for each participant player of the play, and a team-evaluation type game in which a result of each play is determined for each participant team being a group of participant players of this play. Furthermore, as a multiple-player game, a competition type game may be mentioned in which, in each play, participant players of this play or participant teams of the play compete with one another, or a cooperation type game in which participant players or participant teams cooperate with one another. A competition type game includes a match-up game in which participant players or participant teams go against one another.

A "play" of a game is a single act of a player performing a game. Therefore, in a single game, plural plays can be repeated by the same player, and plural plays may be performed simultaneously by plural players. A period of a single play is called a "game period". A game period can be fixed or unfixed, depending on the game. A person who can perform each play is called a "player" of the play or game. Therefore, even if a person has not played a game in the past or is not currently playing a game, a person who potentially plays a game is sometimes called a player. However, a player who is actually playing a game and has played a game, in particular, is called a "participant player (participating player)" of the play. The "participation" means playing either a single player game or a multiple-player game. In each play, a "result" of the play is an evaluation which a participant player of the play has as an object. Examples of a result of a play include win or loss, a rank, and a score.

A "computer game" is a game for which a play is carried out by a computer. A computer used for carrying out a computer game is called a "game apparatus" for the computer game. Among game apparatuses for a computer game is a "game terminal" which has a user interface for operation by a player of the computer game. A game terminal may be at least capable of carrying out a single computer game or may also be capable of carrying out plural computer games.

A place at which a game terminal is installed is called a "game place". Examples of a game place include a facility at which visitors use the installed game terminal by paying a fee (for example, a game arcade) and a residential household at which a game terminal is installed. In the former, a visitor in most cases will be a user of a game terminal and will be a player of a computer game; and in the latter, a resident in most cases will be a user of a game terminal and will be a player of a computer game. In the former, a game terminal that has a function of collecting fees from its user (a type of business-use game machine) is installed in most cases; and in the latter, a game terminal that does not have a function of collecting fees from its user (a type of household use game machine) is installed in most cases.

A "network" has terminals and is a generic term for a system in which data can be transmitted and received among plural terminal nodes belonging to the system. Included as an example of a network is a network in which a communication address unique to this network (for example, an IP address (Internet Protocol address)) is assigned to each terminal node belonging to the network. The communication address is used to transmit and receive data among terminal nodes. A "terminal node" is a generic term for a node that serves as a termination of a network from among nodes belonging to the network to which the terminal node belongs. A "node" is a generic term for a device or for a system that transmits or receives data within a network to which the node belongs. Examples of a node include a computer and a network. A network including plural networks as plural nodes is called an "internetwork". Examples of an internetwork include the Internet.

Examples of a network-type game system having plural game terminals include a master-slave type game system, a server-client type game system, and a peer-to-peer type game system. Examples of a master-slave type game system include a game system in which master and slave game terminals are statically determined and a game system in which master and slave game terminals are dynamically determined. Examples of a server-client type game system include a game system in which a server game apparatus and a client game terminal are statically determined, a game system in which both are dynamically determined, and a game system involving a game terminal concurrently working as a server and a client.

A "computer" is a generic term for, from among devices for processing data, one that has a memory for storing data and a processor for executing a computer program stored in the memory. "Data" is a generic term for representing information in a form that is recognizable by a machine such as a computer. Examples of data include data electrically representing information, data magnetically representing information, and data optically representing information. "Information" is a generic term for an object that can be represented by data. The "memory" is a generic term for a device that readably stores data written therein. Examples of the memory include a semiconductor memory, a magnetic memory, and an optical memory. A "computer program" is a generic term for, from among collections of data representing instructions, a collection designating the procedure of a process. Examples of a computer program include a program for causing a computer to carry out a play of a computer game. A "processor" is a generic term for a device that implements an instruction set and that executes a computer program by performing a process of executing instructions represented by data in the computer program in accordance with a procedure designated by the computer program, the computer program being a collection of data representing instructions contained in the instruction set. Examples of a processor include a single CPU (Central Processing Unit) and a collection of plural CPUs.

Examples of a computer include a computer provided with an interface with the outside. Examples of an interface with the outside include: an input unit for receiving input information or data; an output unit for outputting information or data to the outside. "To input" information is a generic term for an act of generating data representing external information by detection or by measurement. Examples of an input unit include a sensor, a button, and a keyboard. "To output" information is a generic term for an act of representing information represented by data in such a way that information can be perceived by a human. Examples of ways in which information can be perceived by a human include by light, by sound, and by vibration. Examples of outputting information by light include displaying images and blinking of lights. Examples of outputting information by sound include emitting sounds by a speaker and driving a sound structure by solenoid (for example, ringing a bell). Examples of outputting information by vibration include oscillation by an oscillator.

Description will next be given of the present invention.

The present invention provides a game system having plural game terminals belonging to a network and a communication apparatus belonging to the network, each of the plural game terminals having: a play processor for performing a play of a computer game; an end notification transmitter for transmitting an end notification indicating an end and a state of the play when the play performed by the play processor ends; a terminal data storage unit for readably storing data written therein; a state request transmitter for transmitting, to the communication apparatus, a state request for requesting the communication apparatus to transmit a state data set, the state data set including a play data item and a time data item, with the play data item indicating a state of at least another play that has ended and the time data item indicating a point in time corresponding to a point in time at which the communication apparatus was notified of the end of the another play; a state receiver for receiving the state data set from the communication apparatus; a terminal state writer for, when the state data set is received by the state receiver, writing the received state data set into the terminal data storage unit; a delay reader for reading from the terminal data storage unit the play data item of the state data set when a delay period has passed since the point in time indicated in the time data item within the state data set; and an information outputter for, when the play data item is read by the delay reader, outputting information corresponding to the state of the play indicated by the play data item, and the communication apparatus having: an apparatus data storage unit for readably storing data written therein; an end notification receiver for receiving an end notification, from one of the plural game terminals, the end notification notifying an end and a state of a play; an apparatus state writer for, when the end notification is received by the end notification receiver, writing a state data set into the apparatus data storage unit, the state data set including a play data item and a time data item, with the play data item indicating a state of the play for which the end is indicated by the received end notification and the time data item indicating a point in time corresponding to a point in time at which the end notification was received; a state request receiver for receiving the state request from one of the plural game terminals; and a state transmitter for transmitting the state data set to the game terminal which has transmitted the state request, after reading the state data set from the apparatus data storage unit when the state request is received by the state request receiver.

This game system is a network-type game system because plural game terminals and a communication apparatus belong to the same network. In this game system, the communication apparatus, when a play of a computer game ends, receives an end notification notifying an end thereof and a state of a play and can store a play data item indicating a state of a play for which an end is indicated by the end notification and a time data item indicating a point in time corresponding to a point in time at which the end notification was received. Furthermore, in this game system, the game terminal, by transmitting a state request, can receive and store a state data set stored in the communication apparatus at that point in time. The game terminal can read a play data item within a state data set when a delay period has passed since the point in time indicated by the time data item within the state data set, to output information corresponding to a state of a play indicated by the play data item. For example, a game terminal can output information corresponding to a state of a play indicated by a play data item included in a state data set that includes a time data set indicating a point in time that is before a current time by a look-back period. A "point in time corresponding to a point in time at which the end of a play was notified", in other words, a "point in time corresponding to a point in time at which an end notification was received" is a point in time at which the communication apparatus received an end notification, or is a point in time that is different by a certain period of time from the point of receiving the end notification. Accordingly, a "point in time corresponding to a point in time at which the end of a play was notified", in other words, a "point in time corresponding to a point in time at which an end notification was received" may be a point in time that is later by a predetermined period of time (for example, 0.1 seconds) since the communication apparatus received the end notification, or alternatively, may be a point in time that is earlier by a predetermined period of time (for example, 0.1 seconds) than a point in time at which the communication apparatus received the end notification. Points in time indicated by plural state data sets are based not on respective time lines of plural game terminals but are based on a single time line of the communication apparatus, and therefore, the difference between points in time indicated by these state data sets is the difference in a received point in time of the communication apparatus. Therefore, in this game system, the accurate transition in a state of a play is notified belatedly by a delay period. Thus, according to this game system, if a delay period is appropriately set, a cycle of transmissions for a state request from a game terminal to a communication apparatus can be sufficiently extended. Therefore, according to this game system, the accurate transition in a state of each play in the game system can be notified to a player participating in a play without creating an excessive communication processing load. Even if delay is caused, a player can be made fully aware of another participant player because the accurate transition in state, which actually happened, is reported.

A "state of a play" indicated by "a play data item" means at least one of designation information for identifying a player (for example, name, nickname, identification number) or a result of a play (for example, win or loss, rank, score). In a case in which a play data item indicates designation information for identifying a player as a state, a game terminal having transmitted a state request can inform a player who operates this game terminal of designation information for identifying another player who has already ended the play, the designation information being represented by the received state data set. In a case in which a play data item indicates a result of a play as a state of a game, a game terminal having transmitted a state request can inform a player who operates this game terminal of a result of another play that has already ended, the result of a play being represented by a play data item in the received state data set. In a case in which a play data item indicates, as a state of a game, both designation information for identifying a player and a result of a play, a game terminal having transmitted a state request can inform a player who operates this game terminal of designation information for identifying another player who has already ended a play and a result of another play that has already ended, the designation information and the result of the play being represented by a play data item.

Furthermore, a "state of a play" indicated by a "play data item" may include progress information of the play. In this case, a player who operates a game terminal having transmitted a state request can be informed of progress of another play that has already ended.

In the game system, the state request transmitter of each of the game terminals may transmit, to the communication apparatus, the state request when a play is not being performed by the play processor. A game terminal, which has a play processor for performing a play of a computer game, is subject to a high processing load, and, in a case in which a state request is transmitted from a game terminal in such a heavily loaded state to a communication apparatus, the processing load of the game terminal could become excessive. However, according to this mode, such a risk can be eliminated.

A game terminal reads a play data item within a state data set when a delay time has passed since a point in time indicated by a time data item within the state data set transmitted as a response to a state request. Therefore, a game terminal uses only a state data set including a time data item indicating a point in time that falls within a period corresponding to a delay period that ends at a point in time at which the communication apparatus received the state request. If, supposedly, in the above game system, the communication apparatus transmitted, to a game terminal, all the state data sets stored therein at the time of receiving a state request from the game terminal, the communication apparatus would have to transmit a state data set that includes a time data item indicating a point in time which is before the period corresponding to a delay time that ends at the time of receiving a state request. Such a state data set is a useless data set that will never be used by a game terminal in outputting information. Accordingly, in the above game system, the state transmitter of the communication apparatus, in reading a state data set from the apparatus data storage unit, may read every state data set that includes a time data item indicating a point in time falling within a period equal to the delay period, which ends at this time of reading the state data set. According to this mode, because the above useless data will not be transmitted, the communication processing load can be reduced.

The notification (outputting information) is preferably performed throughout a game period. Furthermore, in view of reducing the communication processing load, fewer communications performed by a game terminal for obtaining a state data set is preferable; ideally, once for each play. However, in a game system in which a player is caused to select a game or a game mode as an object of a play from among prepared plural computer games, a game period can differ for each play. Also, there is a computer game for which a game period varies depending on the content of the play. Therefore, if a delay period is to be fixedly determined, the delay time will be a period of time that is sufficiently long compared to the longest game period which one can assume. Doing so, however, could reduce the effect of a player becoming aware of another player because a period of time corresponding to the difference (for example, 30 minutes) between a point in time at which a state is notified in a play having a short game period and a point in time at which this state actually occurred can be longer by far than the game period (for example, 3 minutes).

Accordingly, in a preferred embodiment, each of the game terminals may further have a delay period determiner for determining the delay period, and the state request transmitter of each of the game terminals may transmit the state request including a delay data item indicating the delay period determined by the delay period determiner, and the state transmitter of the communication apparatus, in reading a state data set from the apparatus data storage unit, may read every state data set that includes a time data item indicating a point in time falling within a period equal to the delay period, which ends at this time of reading the state data set. According to this embodiment, because a delay period is variable and is determined at each game terminal for notification to the communication apparatus, a situation is avoided in which a period of time corresponding to the above difference is longer by far than a game period even if the number of communications is made once for each play, and the notification can be performed throughout the game period.

The delay period determiner of each game terminal may decide the delay period at random or may decide the delay period in a manner in which the delay period is equal to or longer than a game period estimated based on a mode of a game that will be performed subsequently. Because a game period of a next play can change depending on a game mode, it is preferable for a designer of a game to determine in advance estimated game periods by compiling statistics of a game period of each game mode.

In a preferred embodiment of the above game system, the state request transmitter of each of the game terminals may transmit another state request to the communication apparatus before a period of time elapsed since transmitting the state request to the communication apparatus exceeds the delay period. According to this mode, because a game terminal transmits a second state request to the communication apparatus, so that the terminal can receive a state data set as a response to the second state request, the above notification can be performed throughout a game period even if the game period is long.

In a preferred embodiment of the above game system, the apparatus state writer of the communication apparatus, when the end notification is received by the end notification receiver, may write the state data set into the apparatus data storage unit in a manner in which the state data set is linked with a game terminal which has transmitted the end notification, the state data set including a play data item and a time data item, with the play data item indicating a state of the play for which the end is indicated by the received end notification and the time data item indicating a point in time corresponding to a point in time at which the end notification was received, and the state transmitter of the communication apparatus, when the state request is received by the state request receiver, may read from the apparatus data storage unit the state data set that is not linked with a game terminal which has transmitted the state request, the state transmitter transmitting the read state data set to the game terminal which has transmitted the state request. According to this embodiment, a game terminal that has transmitted a state request does not receive a state data set of a play performed by this game terminal but can receive a state data set of a player performed by another game terminal.

In another embodiment of the above game system, the communication apparatus may further have a terminal-player link data memory for storing a terminal-player link data set for each play, the terminal-player link data set describing a link between a player participating in the play and the game terminal executing the play; the apparatus state writer of the communication apparatus, when the end notification is received by the end notification receiver, may refer to the terminal-player link data memory and may write the state data set into the apparatus data storage unit in a manner in which the state data set is linked with a player linked with the game terminal which has transmitted the end notification, the state data set including a play data item and a time data item, with the play data item indicating a state of the play for which the end is indicated by the received end notification and the time data item indicating a point in time corresponding to a point in time at which the end notification was received; and the state transmitter of the communication apparatus, when the state request is received by the state request receiver, may refer to the terminal-player link data memory and may read from the apparatus data storage unit the state data set that is not linked with a player linked with the game terminal which has transmitted the state request, the state transmitter transmitting the state data set to the game terminal which has transmitted the state request. According to this embodiment, a game terminal that has transmitted a state request can receive a state data set of a play by a player other than a player currently in the play using the game terminal. In this embodiment, a state data set of a play by another player is transmitted to a game terminal which has transmitted a state request even if a player has used the same game terminal as used by the another player in the past.

In still another preferred embodiment of the above game system, the communication apparatus may further have a terminal-game place link data memory for storing a terminal-game place link data set for each of the game places, in each of which at least one game terminal is located, the terminal-game place link data set describing a link between a game place and the game terminal in the game place; the apparatus state writer of the communication apparatus, when the end notification is received by the end notification receiver, may refer to the terminal-game place link data memory and may write the state data set into the apparatus data storage unit in a manner in which the state data set is linked with a game place linked with the game terminal which has transmitted the end notification, the state data set including a play data item and a time data item, with the play data item indicating a state of the play of which the end is indicated by the received end notification and the time data item indicating a point in time corresponding to a point in time at which the end notification was received; and the state transmitter of the communication apparatus, when the state request is received by the state request receiver, may refer to the terminal-game place link data memory and may read from the apparatus data storage unit the state data set that is not linked with a game place linked with the game terminal which has transmitted the state request, the state transmitter transmitting the state data set to the game terminal which has transmitted the state request. According to this embodiment, a game terminal having transmitted a state request can receive a state data set of a play performed by a game terminal at a game place other than a game place linked with the transmitter game terminal. In other words, a game terminal having transmitted a state request can receive a state data set of a game place where the transmitted game terminal is not located.

In another aspect, the present invention provides a game terminal belonging to a network to which a communication apparatus belongs and being capable of communicating with the communication apparatus, the game terminal having: a play processor for performing a play of a computer game; an end notification transmitter for transmitting an end notification indicating an end and a state of the play when the play performed by the play processor ends; a terminal data storage unit for readably storing data written therein; a state request transmitter for transmitting, to the communication apparatus, a state request for requesting the communication apparatus to transmit a state data set, the state data set including a play data item and a time data item, with the play data item indicating a state of at least another play that has ended and the time data item indicating a point in time corresponding to a point in time at which the communication apparatus was notified of the end of the another play; a state receiver for receiving the state data set from the communication apparatus; a terminal state writer for, when the state data set is received by the state receiver, writing the received state data set into the terminal data storage unit; a delay reader for reading from the terminal data storage unit the play data item within the state data set when a delay period has passed since the point in time indicated by the time data item within the state data set; and an information outputter for, when the play data item is read by the delay reader, outputting information corresponding to the state of the play indicated by the play data item.

According to a network-type game system having this game terminal, the accurate transition in a state of each play in the game system can be notified to a player participating in a play without creating an excessive communication processing load.

In still another aspect, the present invention provides a communication apparatus belonging to a network to which plural game terminals belong, each of the game terminals performing a play of a computer game, the communication apparatus being capable of communicating with each game terminal, the communication apparatus having: an apparatus data storage unit for readably storing data written therein; an end notification receiver for receiving, from one of the plural game terminals, an end notification notifying an end and a state of a play; an apparatus state writer for, when the end notification is received by the end notification receiver, writing a state data set into the apparatus data storage unit, the state data set including a play data item and a time data item, with the play data item indicating a state of the play for which the end is indicated by the received end notification and the time data item indicating a point in time corresponding to a point in time at which the end notification was received; a state request receiver for receiving a state request from one of the plural game terminals, the state request requesting the communication apparatus to transmit the state data set; and a state transmitter for transmitting the state data set to the game terminal which has transmitted the state request, after reading the state data set from the apparatus data storage unit when the state request is received by the state request receiver.

According to a network-type game system having this communication apparatus, the accurate transition in a state of each play in the game system can be notified to a player participating in a play without creating an excessive communication processing load.

In another aspect, the present invention provides a computer program and a computer-readable storage medium having stored therein the computer program for use in a game terminal belonging to a network to which a communication apparatus belongs and being capable of communicating with the communication apparatus, the game terminal having a terminal data storage unit for readably storing data written therein, the computer program causing the game terminal to serve as: a play processor for performing a play of a computer game; an end notification transmitter for transmitting an end notification indicating an end and a state of the play when the play performed by the play processor ends; a state request transmitter for transmitting, to the communication apparatus, a state request for requesting the communication apparatus to transmit a state data set, the state data set including a play data item and a time data item, with the play data item indicating a state of at least another play that has ended and the time data item indicating a point in time corresponding to a point in time at which the communication apparatus was notified of the end of the another play; a state receiver for receiving the state data set from the communication apparatus; a terminal state writer for, when the state data set is received by the state receiver, writing the received state data set into the terminal data storage unit; a delay reader for reading from the terminal data storage unit the play data item within the state data set when a delay period has passed since the point in time indicated by the time data item within the state data set; and an information outputter for, when the play data item is read by the delay reader, outputting information corresponding to the state of the play indicated by the play data item.

According to a network-type game system having a computer having executed this computer program, the accurate transition in a state of each play in the game system can be notified to a player participating in a play without creating an excessive communication processing load. A data carrier can be provided instead of a recording medium.

The present invention provides a computer program and a computer-readable storage medium having stored therein the computer program for use in a communication apparatus belonging to a network to which plural game terminals belong, each of the game terminals performing a play of a computer game, the communication apparatus being capable of communicating with each game terminal, the communication apparatus having an apparatus data storage unit for readably storing data written therein, the computer program causing the communication apparatus to serve as: an end notification receiver for receiving, from one of the plural game terminals, an end notification notifying an end and a state of a play; an apparatus state writer for, when the end notification is received by the end notification receiver, writing a state data set into the apparatus data storage unit, the state data set including a play data item and a time data item, with the play data item indicating a state of the play for which the end is indicated by the received end notification and the time data item indicating a point in time corresponding to a point in time at which the end notification was received; a state request receiver for receiving a state request from one of the plural game terminals, the state request requesting the communication apparatus to transmit the state data set; and a state transmitter for transmitting the state data set to the game terminal which has transmitted the state request, after reading the state data set from the apparatus data storage unit when the state request is received by the state request receiver.

According to a network-type game system having a computer that has executed this computer program, the accurate transition in a state of each play in the game system can be notified to a player participating in a play without creating an excessive communication processing load. A data carrier can be provided instead of a recording medium.

In still yet another aspect, the present invention provides a data management method for use in a communication apparatus belonging to a network to which plural game terminals belong, each of the game terminals performing a play of a computer game, the communication apparatus being capable of communicating with each game terminal, and the communication apparatus having an apparatus data storage unit for readably storing data written therein, the data management method including: an end notification receiving step of receiving an end notification notifying an end and a state of a play from one of the plural game terminals; a writing step of writing a state data set into the apparatus data storage unit after the end notification receiving step, the state data set including a play data item and a time data item, with the play data item indicating a state of the play for which the end is indicated by the received end notification received in the end notification receiving step and the time data item indicating a point in time corresponding to a point in time at which the end notification was received; a state request receiving step of receiving a state request from one of the plural game terminals, the state request requesting the communication apparatus to transmit the state data set; a state reading step of reading the state data set from the apparatus data storage unit after the state request receiving step; and a state transmitting step of transmitting the state data set to the game terminal which has transmitted the state request received in the state request receiving step.

According to a network-type game system having a communication apparatus using this data management method, the accurate transition in a state of a play in the game system can be notified to a player participating in a play without creating an excessive communication processing load.

Effects of the Invention

According to the present invention, in a network-type game system, the accurate transition in a state of each play in the game system can be notified to a player participating in a play without creating an excessive communication processing load.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within the scope thereof.

Configuration of Game System

Figure 1:
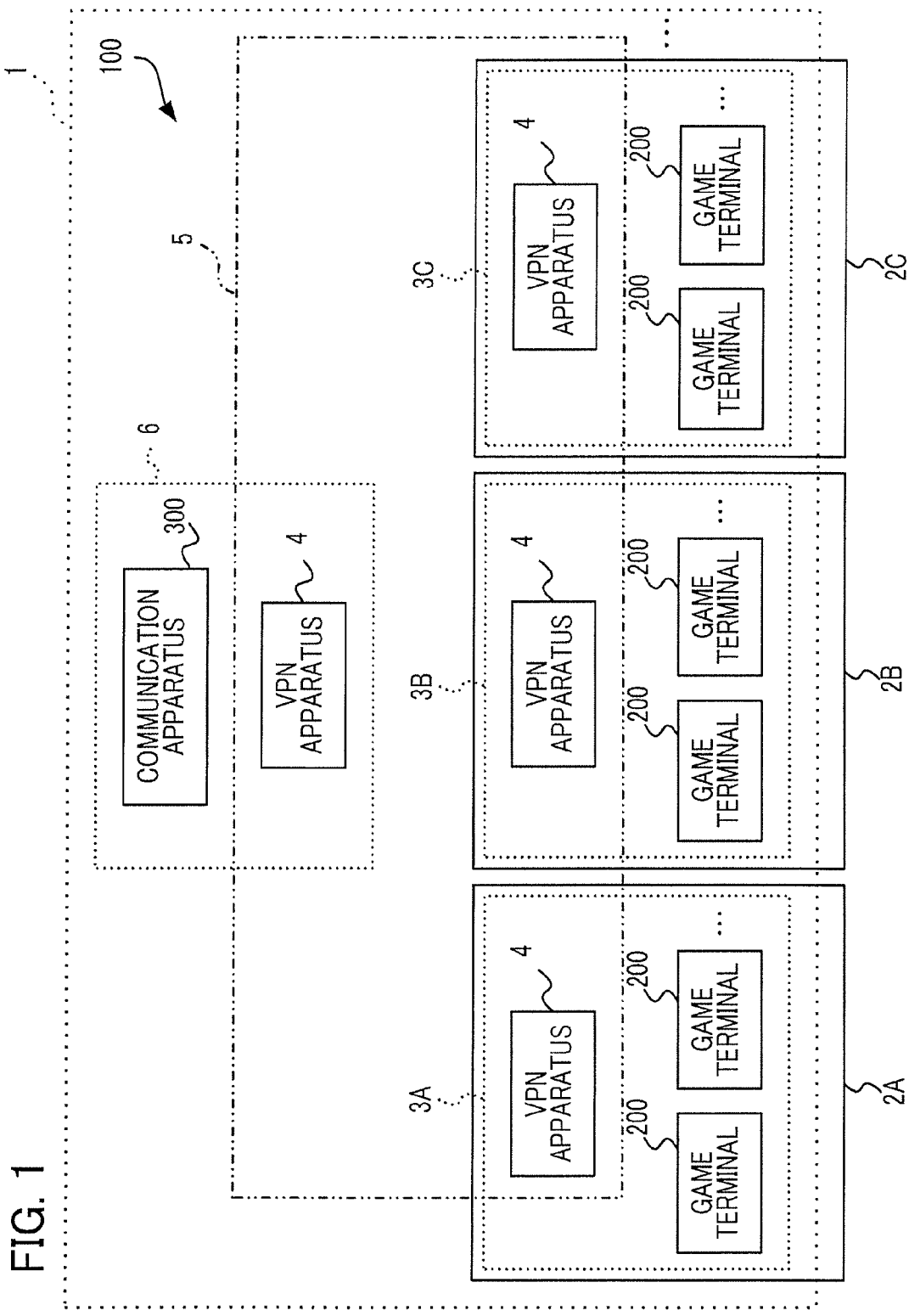
FIG. 1 is a block diagram illustrating a configuration of a game system according to an embodiment of the present invention.

FIG. 1 is a block diagram illustrating a configuration of a game system 100 according to an embodiment of the present invention. Game system 100 is a network-type game system in which plural computer games can be performed simultaneously, in each of which computer games the number of participant players in each play is one (hereinafter referred to as a "single player game"). Game system 100 has plural game terminals 200 each belonging to an internetwork 1 as a terminal node and a communication apparatus 300 belonging to internetwork 1 as a terminal node.

Each game terminal 200 is a game terminal in which a play of a single player game can be performed and belongs to one of plural LANs (Local Area Networks) 3 (3A, 3B, 3C, . . . ) as a terminal node. Each LAN 3 is a network belonging to internetwork 1 as a node and is sited in one of plural game places 2 (2A, 2B, 2C, . . . ). A VPN (Virtual Private Network) apparatus 4 belongs to each LAN 3 as a node. VPN apparatus 4 connecting to each LAN 3 belongs to a VPN 5 as a terminal node.

Communication apparatus 300 is a computer for notifying a participant of each play in a single player game of transition in a state of another play for at least another participant of a single player game and belongs to LAN 6 as a terminal node. LAN 6 is a network belonging to internetwork 1 as a node and is provided in a place other than any of plural game places 2. VPN apparatus 4 belongs to LAN 6 as a node. VPN apparatus 4 belonging to LAN 6 belongs to VPN 5 as a terminal node. VPN 5 is a network virtually constructed on internetwork 1. Communication between game terminals 200 belonging to different LANs 3 or communication between each game terminal 200 and communication apparatus 300 is performed via VPN 5.

Figure 2:
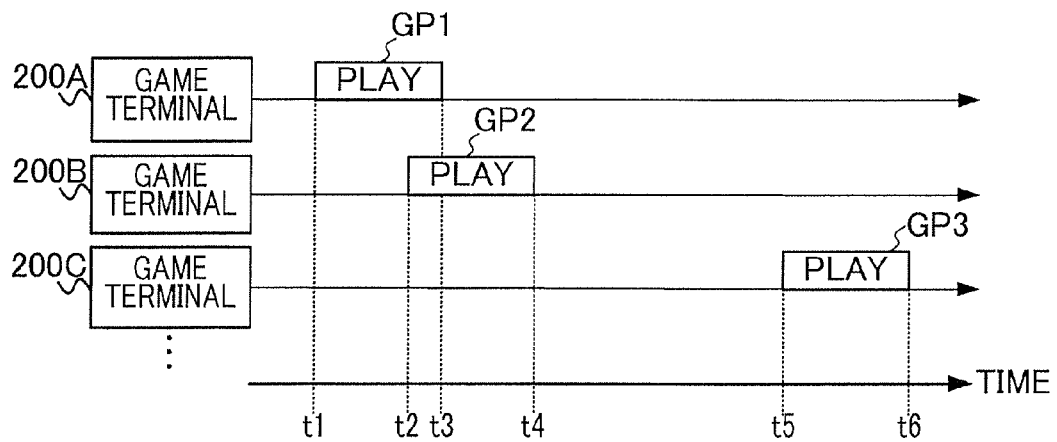
FIG. 2 is a diagram schematically illustrating transitions in states of plays of a single player game in the game system of FIG. 1.

FIG. 2 is a diagram schematically illustrating transitions in states of plays of a single player game in game system 100 of FIG. 1. In this example, we assume that game terminal 200 for performing a play GP1 is a "game terminal 200A", that game terminal 200 for performing a play GP2 is a "game terminal 200B", and that game terminal 200 for performing a play GP3 is a "game terminal 200C". A game period of play GP1 is from time t1 to time t3; a game period of play GP2 is from time t2 to time t4; and a game period of a play GP3 is from time t5 to time t6. As is obvious from the fact that the game period of play GP1 and the game period of play GP2 overlap from time t2 to time t3, game system 100 is capable of simultaneously performing plural plays of a single player game. It is to be noted that in the present embodiment the duration of a game period is the same for each play, and a delay period is determined in a manner in which the delay period is equal to or longer than the duration of the game period.

Configuration of Game Terminal

Figure 3:
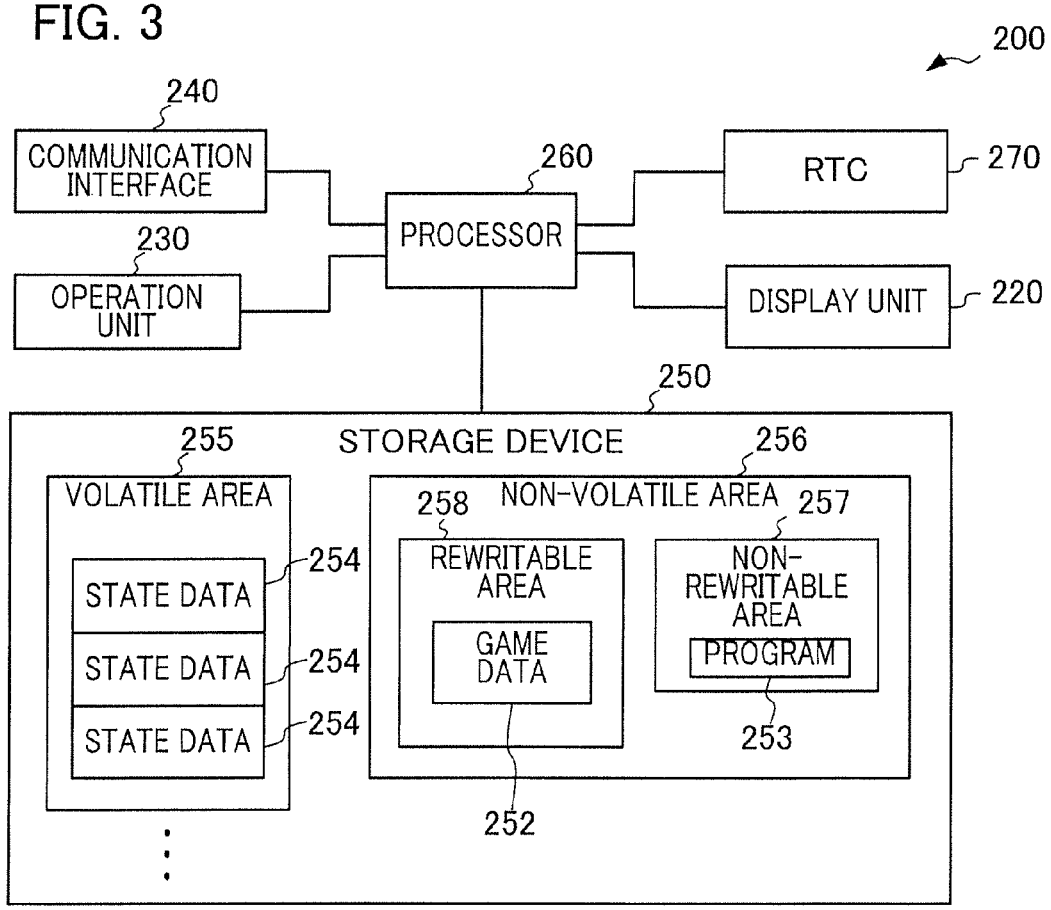
FIG. 3 is a block diagram illustrating a configuration of a game terminal included in the game system of FIG. 1.

FIG. 3 is a block diagram illustrating a configuration of a game terminal 200 included in the game system of FIG. 1. As shown in this figure, game terminal 200 has a display unit 220, an operation unit 230, a communication interface 240, a storage device 250, a processor 260 and an RTC (Real Time Clock) 270. The RTC keeps track of the current time. Display unit 220 is an outputter for outputting information to the outside of game terminal 200 and displays an image represented by data. Examples of display unit 220 include a monitor and a video projector. Operation unit 230 is an input receiver for receiving inputs from the outside of game terminal 200, is operated by a player, and detects the content of the operation to generate data representing a detection result. Examples of operation unit 230 include a button, a keyboard, and a touch panel.

Communication interface 240, in cooperation with processor 260, transmits data to and receives data from the outside. In other words, communication interface 240 and processor 260 serve as an outputter for outputting data to the outside and an input receiver for receiving input of data from the outside. Storage device 250 is for retaining (storing) data written therein and has a volatile area 255 for which power is required for storing the memory content and a non-volatile area 256 for which power is not required. Volatile area 255 is a terminal data storage unit for readably storing data written therein. Non-volatile area 256 is divided into a non-rewritable area 257 in which the memory content is non-rewritable and a rewritable area 258 in which the memory content is rewritable. Volatile area 255 is made of, for example, a RAM (Random Access Memory), non-rewritable area 257 is made of, for example, a ROM (Read Only Memory), and rewritable area 258 is made of, for example, a hard disk.

Figure 4:
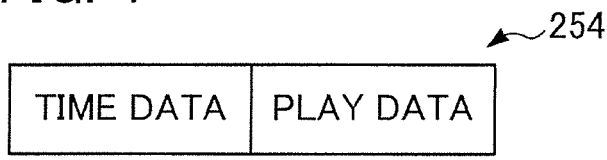
FIG. 4 is a diagram schematically illustrating a data configuration of a state data set used in the game system of FIG. 1.

A state data set 254 indicating a state of another play that has already ended is written into volatile area 255. In response to a request from game terminal 200, communication apparatus 300 transmits state data set 254 to game terminal 200, and processor 260 of game terminal 200, upon receiving state data set 254, writes the state data set 254 into volatile area 255 of storage device 250. A data configuration of state data set 254 is illustrated in FIG. 4. As shown in this figure, state data set 254 contains a time data item indicating a point in time (described later) and a play data item indicating a state of a play. The play data item is specifically a data item representing a name of a participant player (designation information identifying a participant player) and a score (a result of a play). In this embodiment, the play data item represents both designation information identifying a participant player and a result of a play, but may alternatively represent either one. The play data item may represent progress information in addition to at least one of designation information identifying a participant player or a result of a play participant player. In rewritable area 258 of FIG. 3, there is stored game data 252 for performing a play of a single player game. In non-rewritable area 257, there is stored a computer program 263 for causing game terminal 200 to execute a game process (described later). Processor 260 is capable of receiving data generated by operation unit 230, of supplying data to display unit 220, of transmitting data to, and receiving data from, the outside by means of data communication interface 240, of keeping track of the current time in cooperation with RTC 270, and of executing computer program 263.

Configuration of Communication Apparatus

Figure 5:
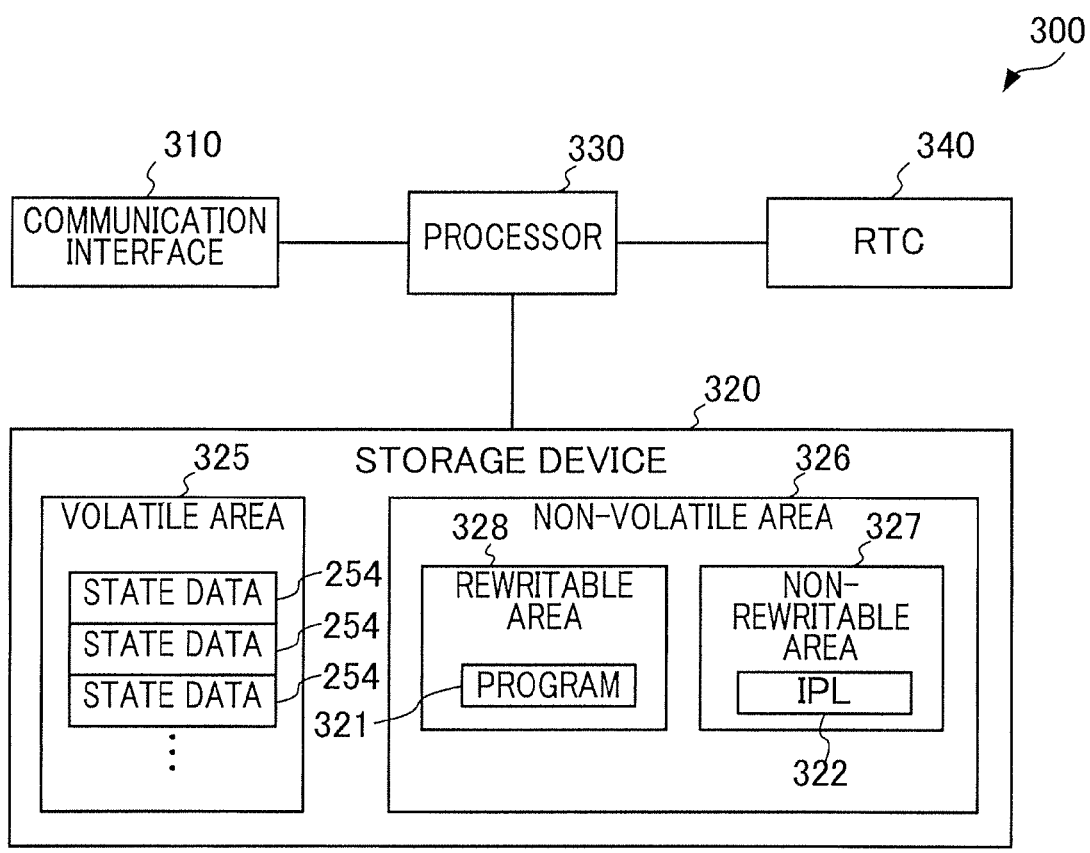
FIG. 5 is a block diagram illustrating a configuration of a communication apparatus included in the game system of FIG. 1.

FIG. 5 is a block diagram illustrating a configuration of communication apparatus 300. As shown in the figure, communication apparatus 300 has a communication interface 310, a storage device 320, a processor 330 and an RTC 340. RTC 340 keeps track of the current time. Communication interface 310, in cooperation with processor 330, transmits data to, and receives data from, the outside. In other words, communication interface 310 and processor 330 serve as an outputter for outputting data to the outside and an input receiver for receiving input of data from the outside.

Storage device 320 is for retaining (storing) data written therein and has a volatile area 325 for which power is required for storing the memory content and a non-volatile area 326 for which power is not required. Volatile area 325 is an apparatus data storage unit for readably storing data written therein. Non-volatile area 326 is divided into a non-rewritable area 327 in which the memory content is non-rewritable and a rewritable area 328 in which the memory content is rewritable. Volatile area 325 is made of, for example, a RAM (Random Access Memory), non-rewritable area 327 is made of, for example, a ROM (Read Only Memory), and rewritable area 328 is made of, for example, a hard disk.

State data set 254 is written in volatile area 325. Each game terminal 200, when a play ends, transmits an end notification to communication apparatus 300, and in response to the end notification, processor 330 of communication apparatus 300 generates state data set 254 related to the play, for storage into volatile area 325. The time data item of state data set 254 represents a value that is in close agreement with a point in time at which the play ended because the time data item indicates a point in time at which the end notification is received at communication apparatus 300. In rewritable area 328, there is stored a computer program 321 for causing communication apparatus 300 to execute a storage process (described later) and a response process (described later) in parallel. In non-rewritable area 321, there is stored an IPL (Initial Program Loader) 322 for enabling processor 330 to load computer program 321 into volatile area 325 for execution. Processor 330 is capable of transmitting data to, and receiving data from, the outside, by using communication interface 310, for keeping track of the current time in cooperation with RTC 340, and of executing IPL 322.

Game Process

Figure 6:
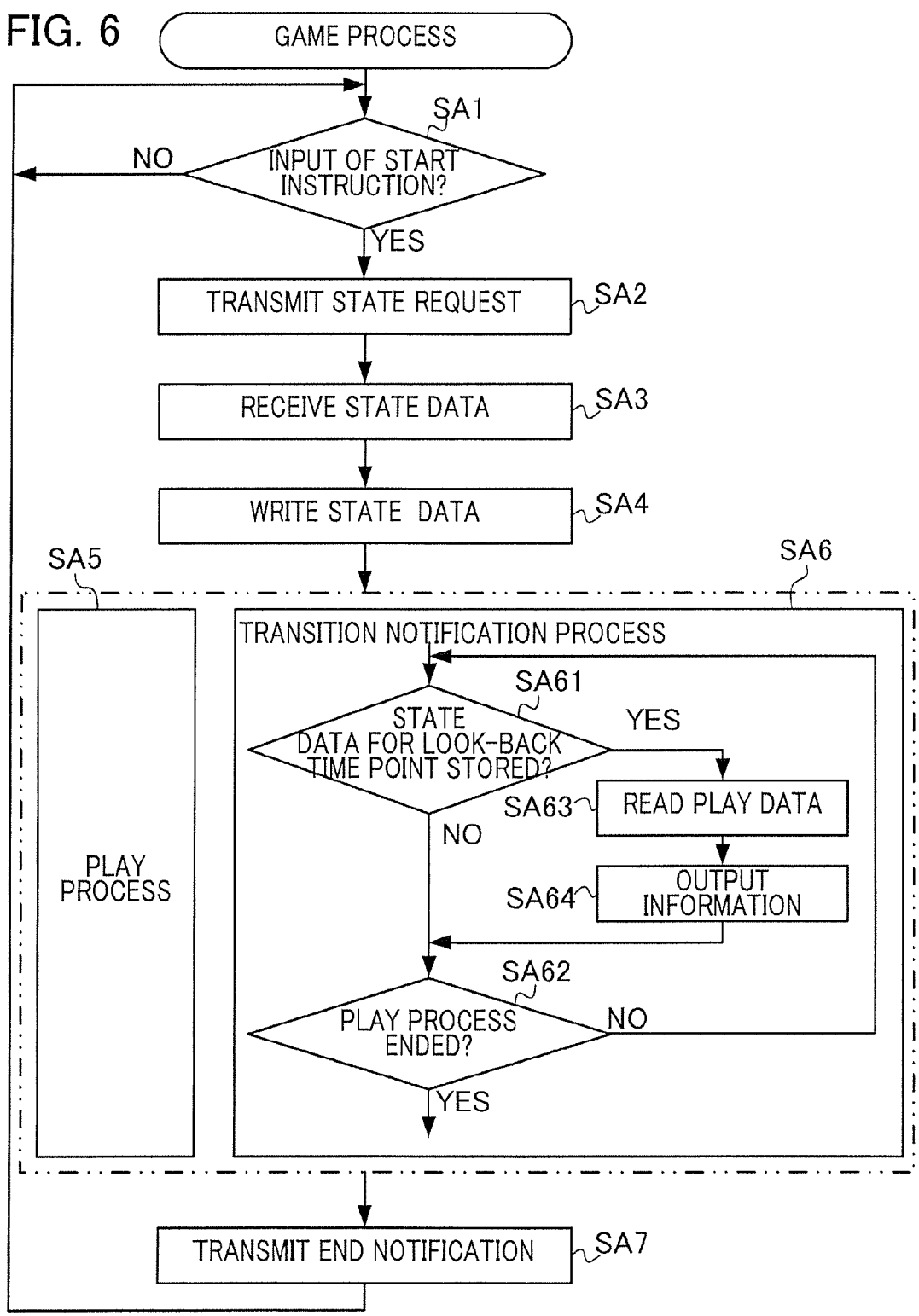
FIG. 6 is a flowchart illustrating a procedure of the game process in the game terminal of FIG. 3.

FIG. 6 is a flowchart illustrating a procedure of a game process at game terminal 200. In the game process, processor 260 first determines whether it has received an input of a start instruction for starting a play of a single player game (Step SA1). A result of this determination becomes positive in a case in which data representing a start instruction is generated by operation unit 230, and becomes negative otherwise. In a case in which this result of the determination is negative, the process returns to Step SA1.

In a case in which a result of the determination in Step SA1 is positive, processor 260, in cooperation with communication interface 240, transmits, to communication apparatus 300, a state request for requesting transmission of a state data set (Step SA2). The state data set is a data set indicating a state of each play that has ended and contains a play data item indicating a state of the play and a time data item indicating a point in time that almost agrees with a point in time at which the play ended. In other words, processor 260 and communication interface 240 serve as a state request transmitter for transmitting a state request to communication apparatus 300, the state request being data for requesting communication apparatus 300 to transmit a state data set containing a play data item indicating a state of another play that has already ended and a time data item indicating a point in time that almost agrees with a point in time at which the play ended.

After transmitting the state request, processor 260 subsequently receives state data set 254 from communication apparatus 300 (Step SA3). In other words, processor 260 and communication interface 240 serve as a state receiver for receiving a state data set from communication apparatus 300. Upon receiving a state data set, processor 260 writes the received state data set 254 into volatile area 255 (Step SA4). In other words, processor 260 serves as a terminal state writer for, when a state data set is received by the state receiver, writing the received state data set into the terminal data storage unit.

When processor 260 completes writing state data set 254, processor 260 executes a play process (Step SA5) for causing game terminal 200 to perform a play of a single player game and a transition notification process (Step SA6) for notifying a participant player of the play of a change in the play of the single player game, the play process and the transition notification process being executed in parallel. Processor 260, by executing the play process, serves as play processor for performing a play of a single player game. In the transition notification process, processor 260 repeats a process of outputting information corresponding to a play data item contained in state data set 254 corresponding to a look-back point in time until the play process ends, details of which follow.

In the transition notification process, processor 260 determines whether a state data set including a time data item indicating a past point in time (look-back time point) is stored in volatile area 255 (Step SA61), and, in a case in which a result of this determination is negative, determines whether the play process of processor 260 itself has ended (Step SA62). In a case in which a result of this determination is negative, the process returns to Step SA61. The look-back time point is a point in time that is earlier by a delay period than a current point in time stored by RTC 270. In this embodiment, a delay period is determined in advance and is therefore fixed, the determination being performed in a manner in which the delay period is equal to or longer than a game period (one play period). On the other hand, processor 260, in a case in which a result of the determination in Step SA61 is positive, reads from volatile area 255 a play data item contained in state data set 254 that includes a time data item indicating a look-back time point (Step SA63) and supplies the play data item to display unit 220, thereby to output information corresponding to this play data item (for example, a score and a name) (Step SA64), to advance the process to Step SA62. That is, processor 260 serves as a look-back reader for reading, from the apparatus data storage unit, a play data item contained in a state data set including a time data item indicating a point in time that is earlier by a delay period than the current time. In other words, processor 260 serves as a delay reader for reading a play data item in the state data set from the apparatus data storage unit when a delay period has passed since a point in time indicated by a time data item within the state data set. Furthermore, processor 260 and display unit 220 serve as an information outputter for, when a play data item is read by the delay reader, outputting information corresponding to a state of a play represented by the read play data item. The transition notification process ends when a result of the determination in Step SA62 becomes positive.

When the play process and the transition notification process are completed, processor 260 transmits to communication apparatus 300 an end notification which is data indicating the end of the play and the state thereof (Step SA7). The end notification specifically is data indicating a result of the play that has ended (for example, a score) or the name of a participant player of the play (designation information identifying the participant player). In other words, processor 260 and communication interface 240 serve as an end notification transmitter for, in a case in which a play performed by a play processor has ended, transmitting an end notification indicating the end and the state of a play to communication apparatus 300. In this embodiment, the end notification represents both designation information for identifying a participant player and a result of a play, but may alternatively represent either one. Furthermore, the end notification may represent the progress of a play in addition to at least one of designation information for identifying a participant player or a result of a play. After Step SA7, the process returns to Step SA1. The name of a participant player (designation information for identifying a participant player) is input by the participant player prior to Step SA7.

Storage Process

Figure 7:
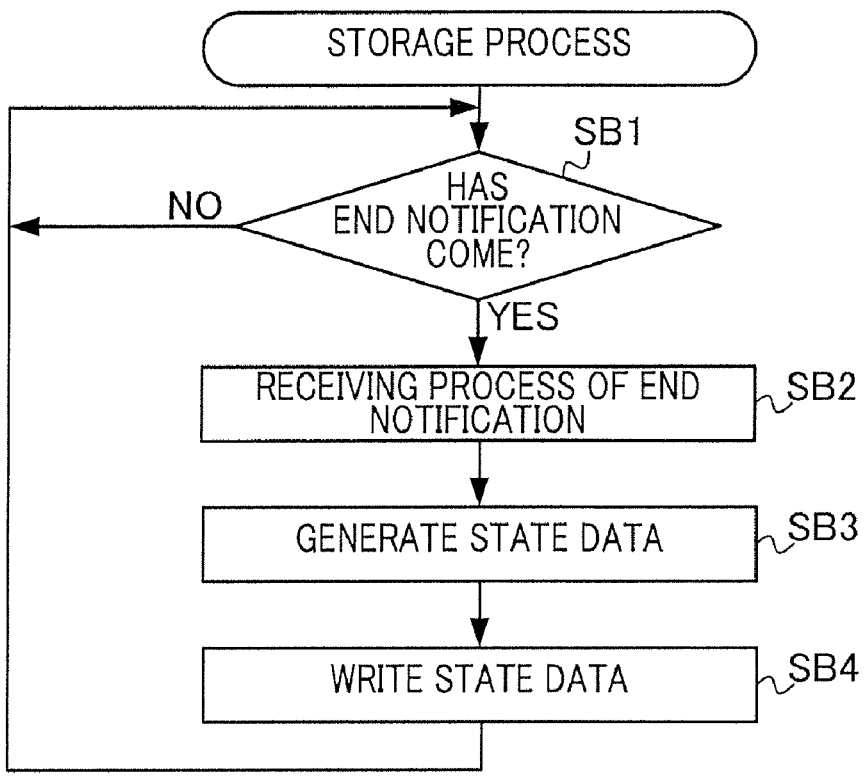
FIG. 7 is a flowchart illustrating a procedure of a storage process in the communication apparatus of FIG. 5.

FIG. 7 is a flowchart illustrating a procedure of a storage process at communication apparatus 300. In the storage process, processor 330 first determines whether an end notification has come in from any of game terminals 200 (Step SB1), and in a case in which a result of the determination is negative, processor 330 returns the process to Step SB1. In a case in which a result of the determination in Step SB1 is positive, processor 330, in cooperation with communication interface 310, executes a receiving process (a process including various steps for receiving) of the incoming end notification (Step SB2). That is, processor 330 and communication interface 310 serve as an end notification receiver for receiving an end notification from one of game terminals 200.

After executing the receiving process of the end notification, processor 330 generates state data set 254 (Step SB3). Specifically, processor 330 generates state data set 254 containing a play data item indicating a state of a play for which the end is indicated by the received end notification and a time data item indicating the current time (a point in time at which the end notification is received). Subsequently, processor 330 writes the generated state data set 254 into volatile area 325 (Step SB4). In other words, processor 330 serves as an apparatus state writer for, when an end notification is received by the end notification receiver, writing a state data set into the apparatus data storage unit, the state data set including a play data item indicating a state of a play for which the end is indicated by the received end notification and a time data item indicating a point in time of receiving the end notification (the current time). After Step SB4, the process returns to Step SB1. In this embodiment, the time data item indicates a point in time at which the communication apparatus received the end notification. As an alternative embodiment, the time data item may represent a point in time that is later by a predetermined time (for example, 0.1 seconds) than the point in time at which the communication apparatus received the end notification or may represent a point in time that is earlier by a predetermined time (for example, 0.1 seconds) than the point in time at which the communication apparatus received the end notification.

Response Process

Figure 8:
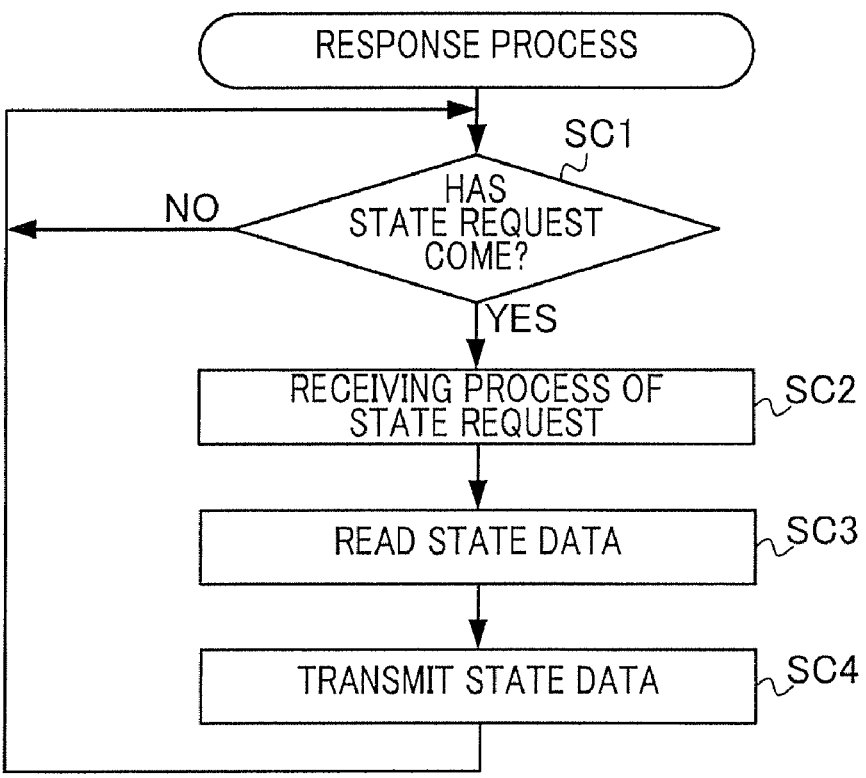
FIG. 8 is a flowchart illustrating a procedure of a response process in the communication apparatus of FIG. 5.

FIG. 8 is a flowchart illustrating a procedure of a response process at communication apparatus 300. In the response process, processor 330 first determines whether a state request has come in from any of game terminals 200 (Step SC1) and, in a case in which a result of the determination is negative, returns the process to Step SC1. In a case in which a result of the determination in Step SC1 is positive, processor 330 executes, in cooperation with communication interface 310, a receiving process (a process including various steps for receiving) of the incoming state request (Step SC2). That is, processor 330 and communication interface 310 serve as a state request receiver for receiving a state request from one of plural game terminals.

Figure 9:
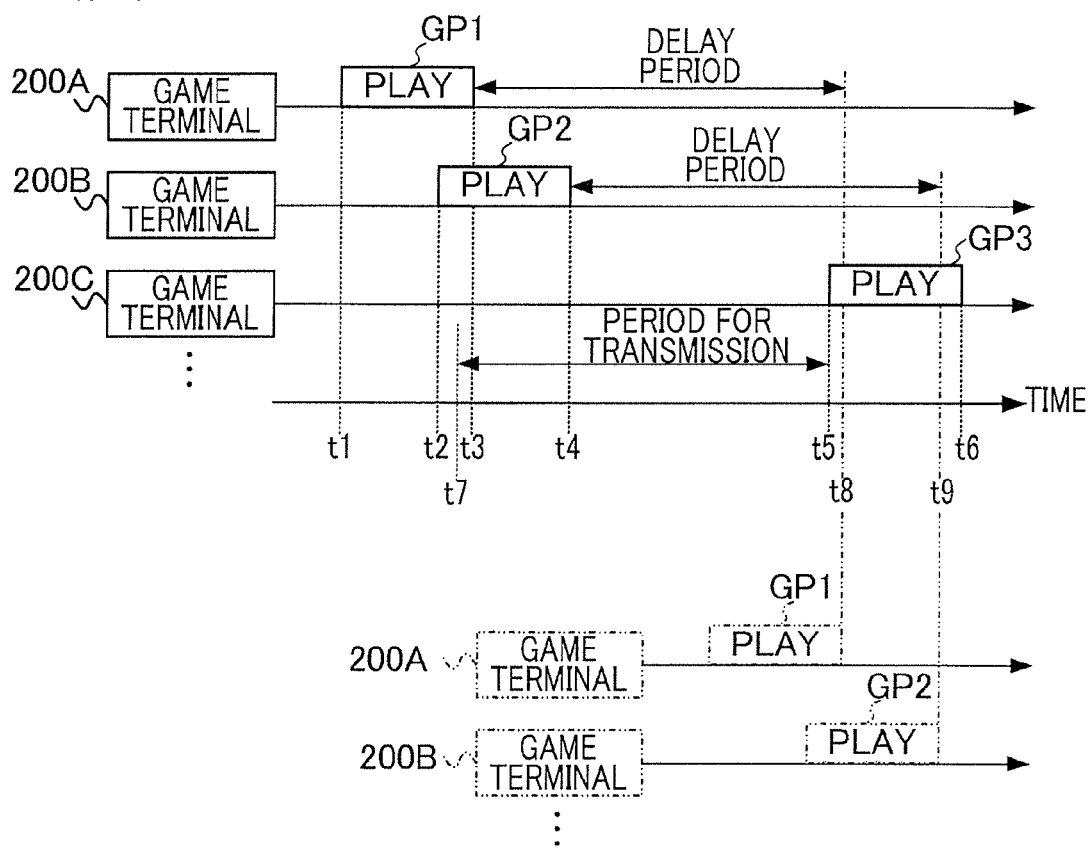
FIG. 9 is a time chart for describing an operation of the game system of FIG. 1.

After executing the receiving process of the state request, processor 330 reads a state data set from volatile area 325 (Step SC3). Specifically, processor 330, from volatile area 325, reads every state data set that includes a time data item indicating a point in time within a period (a period for transmission) that is equal to a delay period that ends at the current time kept by RTC 340. For example, as illustrated in FIG. 9, in a case in which a state request is received from game terminal 200C immediately before starting play GP3, the current time is of a close agreement with the start point in time t5 of play GP3; and a point in time that is earlier by a period equal to a delay period than the current time corresponds to time t7 between time t2 and time t3. Accordingly, in response to the state request, a state data set related to play GP1 or play GP2 including a time data item indicating a point in time that falls within a period from time t7 to time t5 is transmitted to game terminal 200C. Subsequently, processor 330, in cooperation with communication interface 310, transmits the read state data set to a transmitter game terminal of the state request received in Step SC2 (Step SC4). That is, processor 330 and communication interface 310 serve as a state transmitter for, when a state request is received by the state request receiver, reading a state data set from the apparatus data storage unit, for transmission to a game terminal that has transmitted the received state request. Hereinafter, the process returns to Step SC1.

Processor 330 of communication apparatus 300 thus replies to the state request, selects a state data set indicating a point in time within the period for transmission that is equal to a delay period ending at the time point of the process of receiving the state request, and transmits the state data set to game terminal 200 having transmitted the state request. Game terminal 200, during the play process, determines periodically whether there is a play data item which processor 260 should read (Step SA61 in FIG. 6) and reads the play data item when the time reaches a point in time at which the data item should be read, for outputting information (Steps SA63 and SA64 in FIG. 6). Because processor 260 reads a play data item based on the look-back time point that is earlier by a delay period than the current time, information corresponding to the play data item is output at a point in time that is later by almost a delay period than the end of a game at another game terminal.

In the example shown in FIG. 9, a participant player of play GP3 at game terminal 200C is notified at time t8, during the game period, of an end and a state of play GP1 (for example, the score and the name of a participant player) which was performed at game terminal 200A, and an end and a state of play GP2 which was performed at game terminal 200B is notified at time t9. These notifications are performed at a timing that is later by a certain delay period. A point in time indicated by a state data set related to play GP1 and a point in time indicated by a state data set related to play GP2 are not timelines of game terminals 200A and 200B, respectively, but are based on a single timeline of communication apparatus 300, and therefore, the difference between points in time indicated by the state data sets corresponds to the difference between the received points in time at communication apparatus 300. Accordingly, the time interval between the notifications almost corresponds to the time interval between the actual end times of play GP1 and play GP2. Thus, the accurate transitions in states of plays of a single player game are notified to a participant player of play GP3.

As has been described in the foregoing, game system 100 is a network-type game system because plural game terminals 200 and communication apparatus 300 belong to the same internetwork 1. In game system 100, communication apparatus 300, when a play of a single player game ends, receives an end notification indicating the end and a state of the play, whereby communication apparatus 300 can store state data set 254 including a play data item indicating a state of a play for which the end is indicated by this end notification and a time data item indicating a point in time at which the end notification was received. Furthermore, in game system 100, game terminal 200 transmits a state request, thereby receiving state data set 254 stored at communication apparatus 300 at this point in time, for storage in game terminal 200. Moreover, in game system 100, game terminal 200 can output information corresponding to a state of a play represented by a play data item contained in a state data set that includes a time data item indicating a point in time that is earlier by a delay period than the current time. Therefore, game terminal 200 can output information corresponding to a state of a play represented by a play data item by reading the play data item within the state data set after a delay period has passed since the point in time indicated by a time data item within the state data set. Because points in time indicated by plural state data sets are not timelines of plural game terminals 200, respectively, but are based on a single timeline of communication apparatus 300, the difference between the points in time indicated by the state data sets is the difference between received points in time at communication apparatus 300. Therefore, in game system 100, the accurate transition in a state of each play in game system 100 is notified at a timing that is later by a delay period. Furthermore, in game system 100, the delay period is determined in a manner in which the delay period is equal to or longer than the game period. Therefore, according to game system 100, a transmission cycle of a state request from game terminal 200 to communication apparatus 300 can be sufficiently prolonged. Thus, according to game system 100, the accurate transition in a state of a play in game system 100 can be reported to a participant player of another play without causing excessive communication processing load. Even if delay is caused, a player can be made fully aware of another participant player because the accurate transition in state, which actually happened, is reported.

Furthermore, according to game system 100, because transmission of a state request is performed during a period in which a play is not performed at transmitter game terminal 200, the risk can be eliminated of processing load of the transmitter game terminal 200 becoming excessive. Nevertheless, as an alternative embodiment, transmission of a state request may be performed when a play is being executed at transmitter game terminal 200.

Game terminal 200 reads a play data item within a state data set transmitted as a response to a state request after a delay period has passed since a point in time indicated by a time data item of the state data set. Therefore, the game terminal uses only a state data set that includes a time data item indicating a point in time that falls within a period corresponding to a delay period that ends at a point in time at which communication apparatus 300 received a state request (a period corresponding to the above period for transmission). If, in game system 100, communication apparatus 300 transmitted, to game terminal 200, all the state data sets stored at the time of receiving state request data from game terminal 200, communication apparatus 300 would transmit a state data set including a time data item indicating a point in time that is before a period corresponding to a delay period that ends at a point in time at which communication apparatus 300 received a state request (the above period for transmission). Such a state data set is useless data, which will never be used for outputting information at a game terminal. However, according to game system 100, from among state data sets stored in communication apparatus 300, a state data set including a time data item indicating a point in time that falls within the above period for transmission is delivered, and therefore, useless delivery can be reduced. Nevertheless, as an alternative embodiment, all the state data sets stored in communication apparatus 300 can be delivered.

As another embodiment, game terminal 200 may be further provided with a delay period determiner for deciding a delay period, so that delay period data is included in a state request transmitted from game terminal 200, the delay period data indicating a delay period determined by the delay period determiner. The state transmitter of communication apparatus 300, in reading a state data set from the apparatus data storage unit, may read every state data set including a time data item indicating a point in time that falls within the period for transmission, which is equal to a delay period that ends at the current time (a time point of reading the state data set) and is indicated by the delay period data. According to this embodiment, even in a case in which a game period is not the same for all plays, delivery of useless data can be reduced if the game period of a play can be identified prior to the start of the play. The delay period determiner of each game terminal may determine a delay period at random or may determine a delay period so that the delay period will be equal to or longer than a game period that is estimated depending on a mode of a game that will be performed subsequently. Because a game period of a subsequent play can change depending on a game mode, it is preferable for a designer of a game to determine in advance estimated game periods by compiling statistics of a game period of each game mode.

Figure 10:
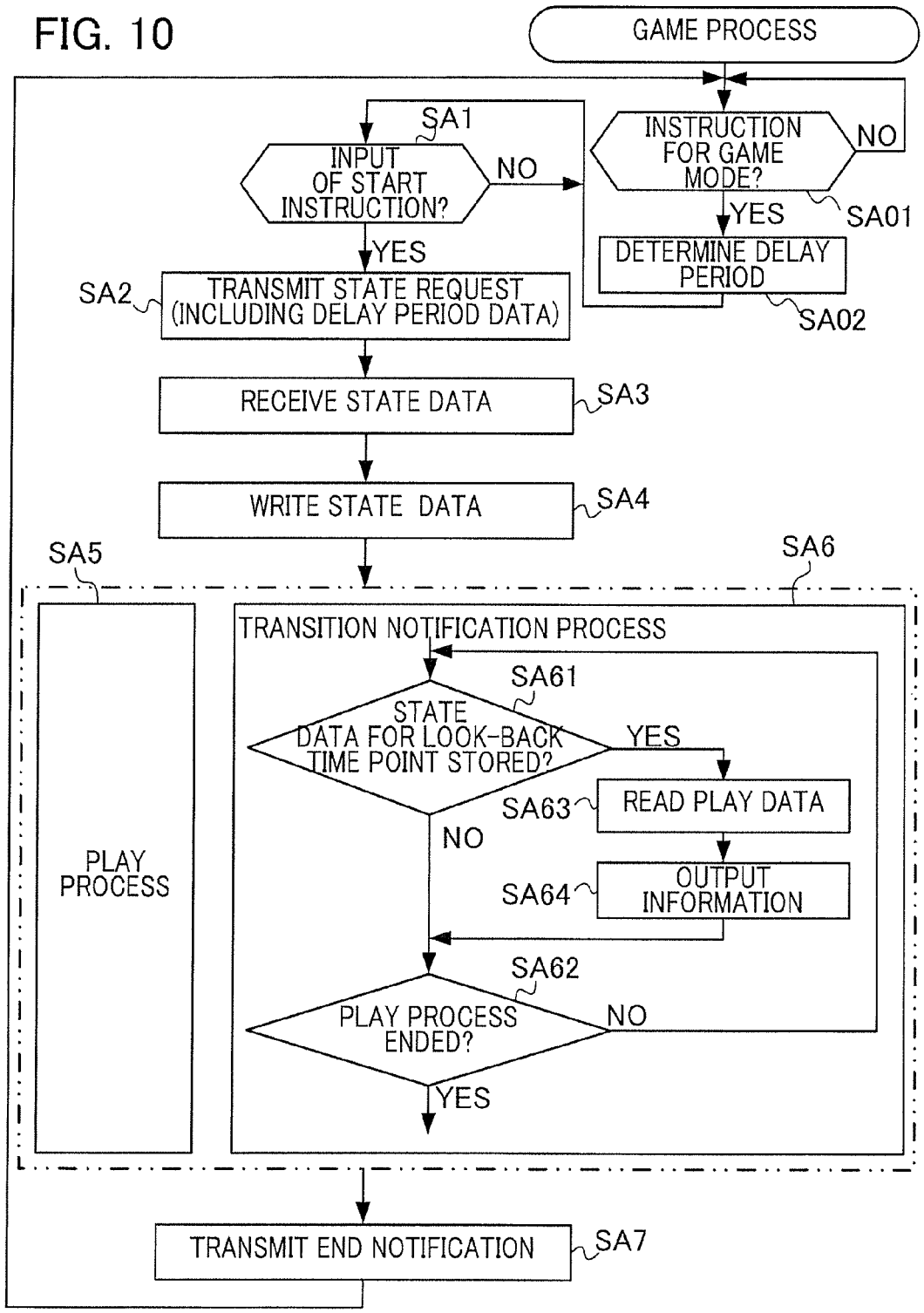
FIG. 10 is a flowchart illustrating a procedure of a game process in a game terminal according to another embodiment of the present invention.

More specific descriptions will be given of this modified embodiment. In non-volatile area 256 (delay period storage unit) in storage device 250 of each game terminal 200, there is stored a delay period for each game mode. The delay period is determined in advance by a designer of a game so that the delay period will be equal to or longer than a game period that is estimated for each game mode. As shown in FIG. 10, in the game process, processor 260 first determines whether an instruction for a game mode has been input, the instruction indicating which game mode is selected by a player (Step SA01). A result of the determination becomes positive in a case in which data indicating an instruction for a game mode is generated by operation unit 230 and becomes negative otherwise. In a case in which this result of the determination is negative, the process returns to Step SA01.

In a case in which a result of the determination in Step SA01 is positive, processor 260 serves as a delay period determiner to determine a delay period based on the instructed game mode (Step SA02). Specifically, a delay period corresponding to the instructed game mode is read from non-volatile area 256 of storage device 250. Hereinafter, when a start instruction is input (Step SA1), processor 260, in cooperation with communication interface 240, serves as a state request transmitter, to transmit to communication apparatus 300 a state request for requesting transmission of a state data set (Step SA2). This state request includes not only a request for transmission of a state data set, but also includes delay period data indicating the delay period. In response to the state request, processor 330, being a state transmitter of communication apparatus 300, in reading a state data set from volatile area 325 (apparatus data storage device) of storage device 320, reads every data set including a time data item indicating a point in time that falls within a period for transmission that ends at the current time (a point in time of this reading) with the period for transmission being equal to the delay period indicated by the delay period data, for transmission to game terminal 200 that has transmitted the state request. Processor 260, upon receiving the state data set, writes the received state data set 254 into volatile area 255 (Step SA4).

The other processes of FIG. 10 are the same as those described with respect to FIG. 6. However, the look-back time point in Step SA61 is a point in time that is earlier by a delay period determined by processor 260 than the current time. Processor 260 reads, from volatile area 255, a play data item within a state data set after a delay period (the delay period determined by processor 260) has passed since a point in time indicated by a time data item within the state data set.

As an alternative embodiment, the delay period determiner may be provided in communication apparatus 300. That is, communication apparatus 300 may have a delay period determiner for determining a delay period and a delay period transmitter for, when a state request is received by a state request receiver, transmitting delay period data indicating a delay period determined by the delay period determiner to game terminal 200 that has transmitted the received state request; and game terminal 200 may have a delay period receiver for receiving delay period data from communication apparatus 300. Furthermore, a state data set read from the apparatus data storage unit by the state transmitter of communication apparatus 300 may be limited to a state data set that includes a time data item indicating a point in time that falls within a period for transmission that ends at the current time (a point in time of this reading), with the period for transmission being equal to a delay period determined by the delay period determiner, and the delay reader of game terminal 200 may read a play data item within a state data set after a delay period indicated by delay period data received by the delay period receiver has passed since a point in time indicated by a time data item within the state data set.

Figure 11:
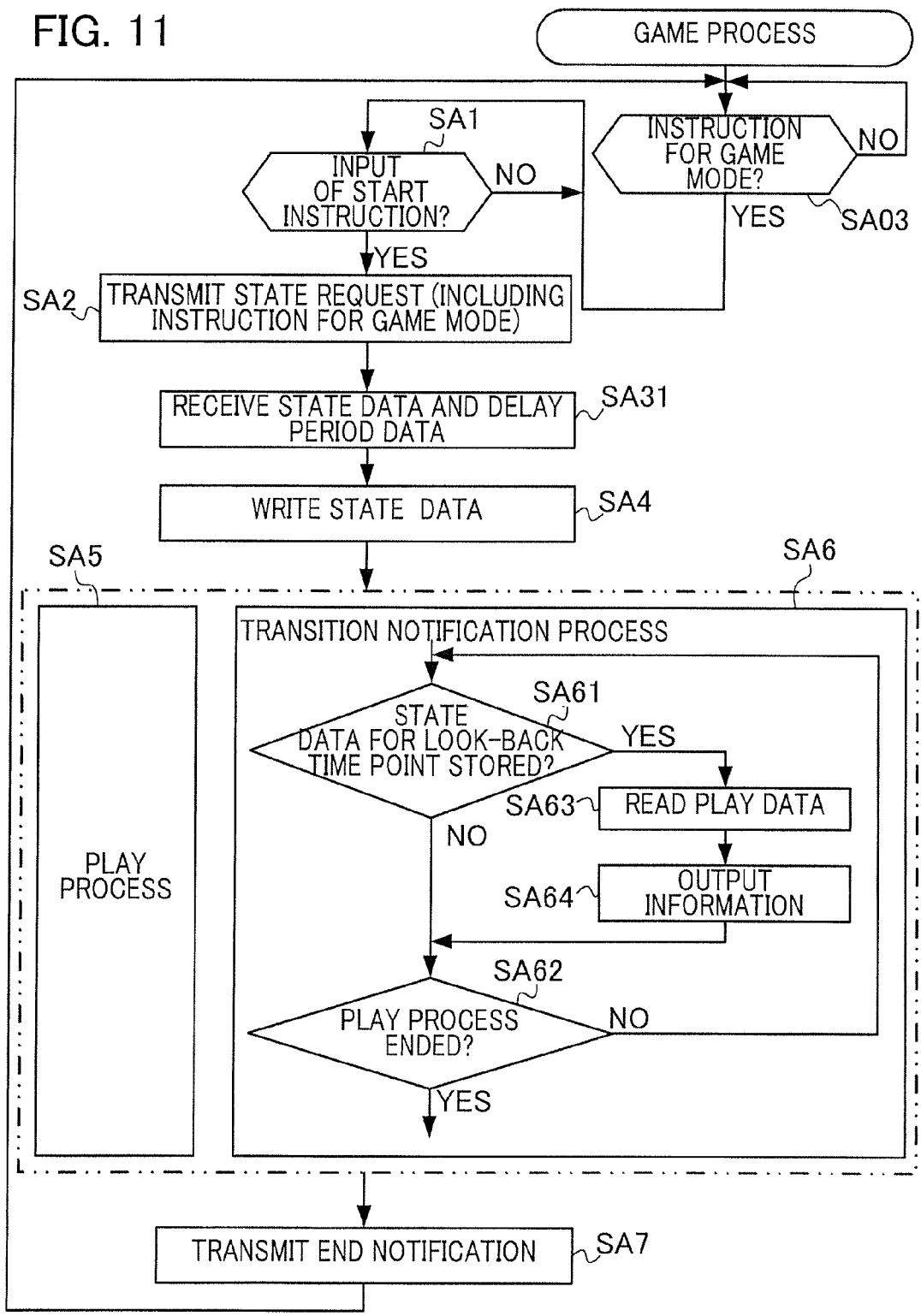
FIG. 11 is a flowchart illustrating a procedure of a game process in a game terminal according to still another embodiment of the present invention.

More specific description will be given of this modified embodiment. A delay period for each game mode is stored in non-volatile area 326 of storage device 320 in communication apparatus 300. The delay period is determined in advance by a designer of a game so that the delay period will be equal to or longer than a game period that is estimated for each game mode. As shown in FIG. 11, in the game process, processor 260 of game terminal 200 first determines whether an instruction for a game mode was input, the instruction indicating which game mode is selected by a player (Step SA03). A result of the determination changes to be positive in a case in which data indicating an instruction for a game mode is generated by operation unit 230 and changes to be negative otherwise. In a case in which this result of the determination is negative, the process returns to Step SA03.

In a case in which a result of the determination in Step SA03 is positive, hereinafter, when a start instruction is input (Step SA1), processor 260, in cooperation with communication interface 240, serves as a state request transmitter, to transmit to communication apparatus 300 a state request requesting for transmission of a state data set (Step SA2). This state request includes not only a request for transmission of a state data set but also includes data indicating the game mode.

Figure 12:
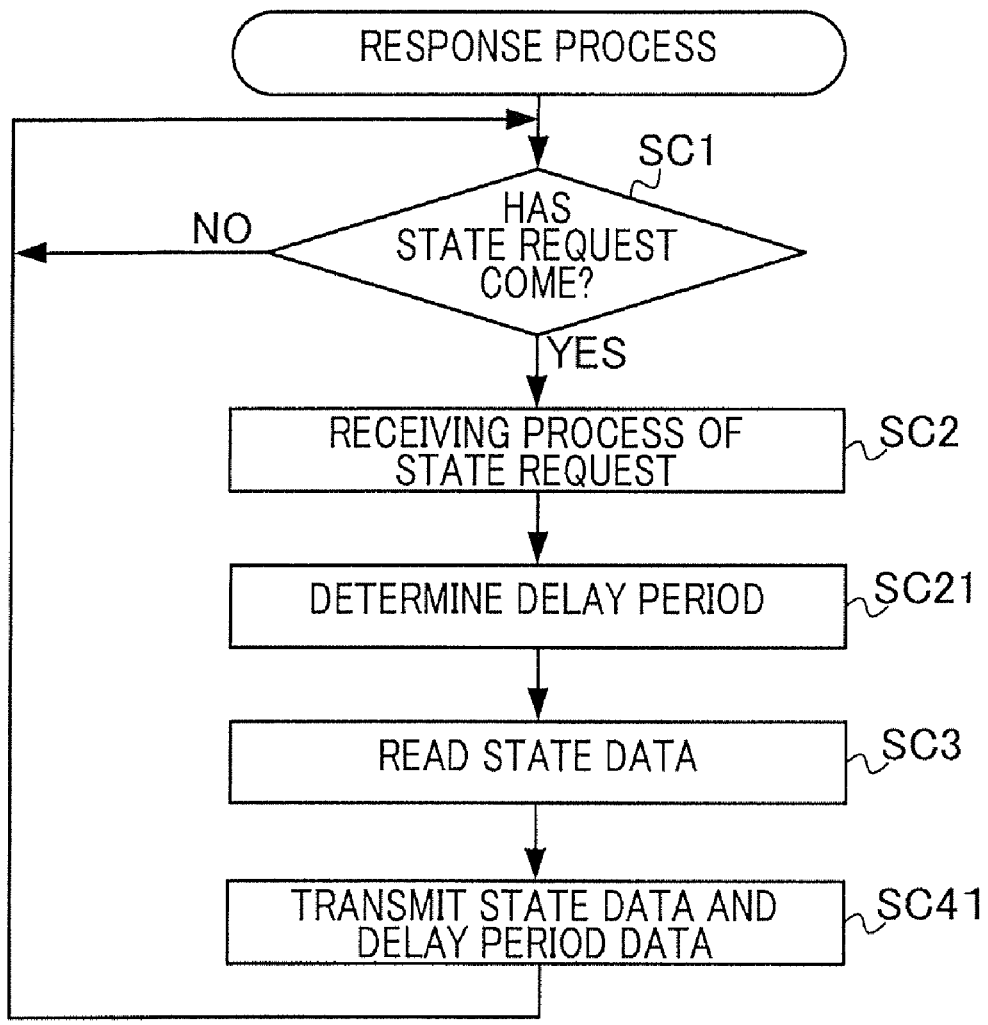
FIG. 12 is a flowchart illustrating a procedure of a response process in a communication apparatus in the embodiment corresponding to FIG. 11.

Communication apparatus 300, as shown in FIG. 12, upon executing a receiving process of the state request (Step SC2), processor 330 serves as a delay period determiner to determine a delay period based on the game mode instructed by the state request (Step SC21). Specifically, processor 330 reads a delay period corresponding to the instructed game mode from non-volatile area 326 of storage device 320. Subsequently, processor 330 serves as a state transmitter, in reading a state data set from volatile area 325 (the apparatus data storage unit) of storage device 320, reads every data set including a time data item indicating a point in time that falls within a period for transmission that ends at the current time (a point in time of this reading), with the period for transmission being equal to the delay period determined by processor 330, for transmission to game terminal 200 that has transmitted the state request (Steps SC3 and SC41). Furthermore, processor 330 and communication interface 310 transmit delay period data indicating the delay period determined by processor 330 to game terminal 200 that has transmitted the state request (Step SC41).

Processor 260 of game terminal 200 serves as a state receiver and a delay period receiver, to receive from communication apparatus 300 state data set 254 and the delay period data (Step SA31). Upon receiving the state data set, processor 260 writes the received state data set 254 into volatile area 255 (Step SA4). The other processes of FIG. 11 are the same as those described with respect to FIG. 6. Except, the look-back time point in Step SA61 is a point in time that is earlier by a delay period determined by processor 330 of communication apparatus 300 than the current time. Processor 260 reads, from volatile area 255, a play data item within a state data set, after a delay period (the delay period determined by processor 330) has passed since a point in time indicated by a time data item within the state data set. According to this embodiment, even in a case in which a game period is not the same for all plays, delivery of useless data can be reduced if the game period of a play can be identified prior to the start of the play.

As still yet another embodiment, the state request transmitter may transmit a second state request to communication apparatus 300 before a period of time elapsed since transmitting a state request to communication apparatus 300 exceeds a delay period.

Figure 13:
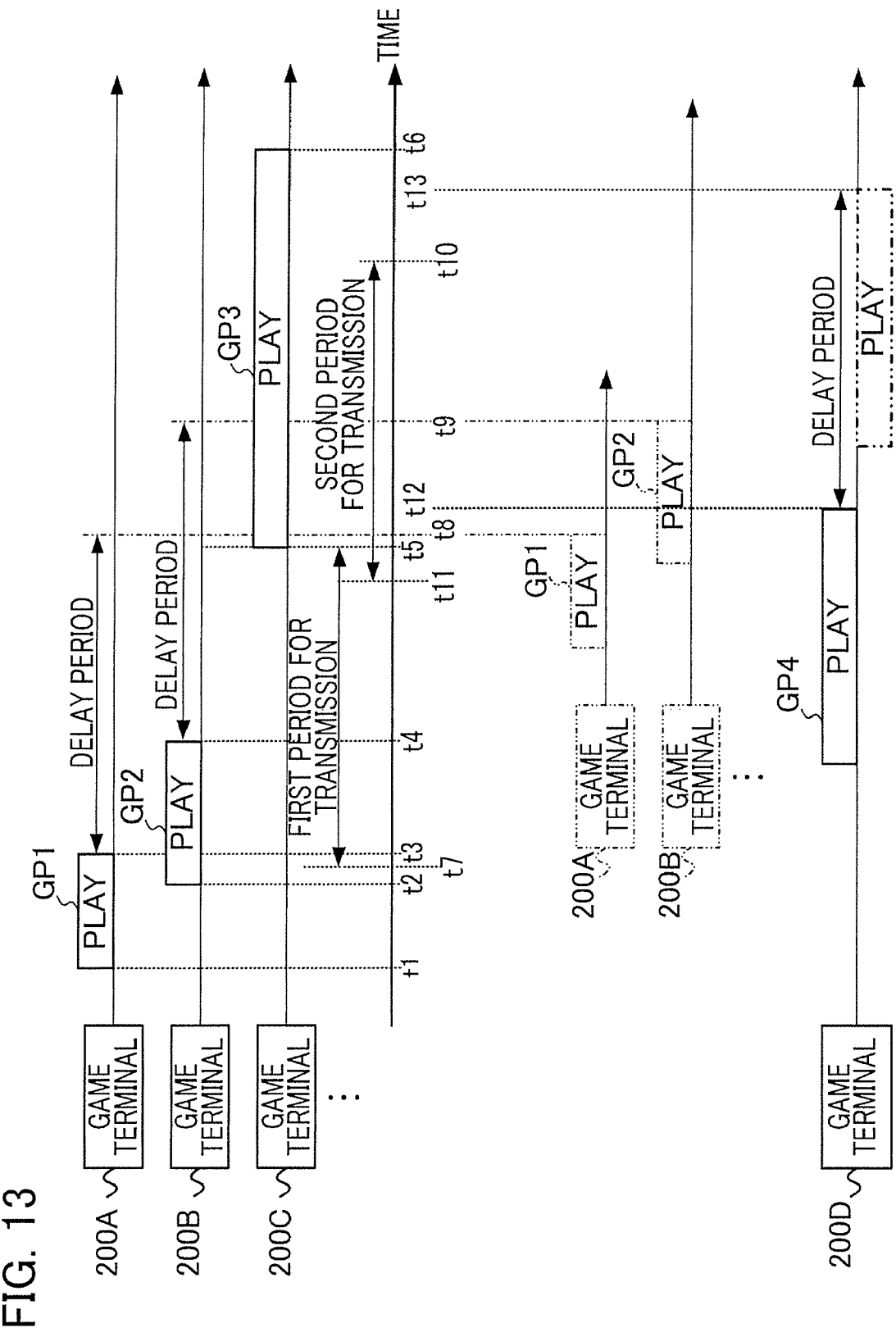
FIG. 13 is a time chart illustrating an operation of a game system according to yet another embodiment of the present invention.

More specific description will be given of this modified embodiment. For example, as illustrated in FIG. 13, game terminal 200C for performing a play GP3 transmits a first state request immediately before the start of play GP3 (at a point in time almost corresponding to time t5). In response to the first state request, processor 330 of communication apparatus 300 transmits, to game terminal 200C, a state data set for play GP1 and play GP2 respectively, each state data set including a time data item indicating a point in time that indicates a time point within a first transmission period equal to a delay period that starts at time t7 and that ends at time t5. Accordingly, a participant player of play GP3 at game terminal 200C is notified, during the game period of play GP3, of an end and a state of play GP1 performed at game terminal 200A (for example, the score and name of a participant player) at time t8, and of an end and a state of play GP2 performed at game terminal 200B at time t9. The process up to this point is the same as the above embodiment.

However, in a case in which play GP3 at game terminal 200C is prolonged, the participant player of play GP3 at game terminal 200C will ultimately not be notified of anything. To be specific, after a delay period has passed since a point in time almost corresponding to time t5 at which the first state request was transmitted, the participant player of play GP3 at game terminal 200C will not be notified of anything. This is because the state data set indicates another play that has ended before the point in time almost corresponding to time t5 and because game terminal 200C uses a play data item within a state data set after a delay period has passed since a point in time indicated by a time data item within the state data set. To avoid this from happening, before a delay period has passed since a point in time almost corresponding to time t5 at which the first state request was transmitted to communication apparatus 300 (for example, at time t10), processor 260, in cooperation with communication interface 240, serves as the state request transmitter, to transmit a second state request to communication apparatus 300. Processor 330 of communication apparatus 300, in response to the second state request, can transmit to game terminal 200C a state data set including a time data item indicating a point in time that falls within a second transmission period equal to a delay period that starts at time t11 and ends at time t10. For example, play GP4 of game terminal 200D ends at time t12 within the second transmission period, and a time data item of a state data set corresponding to play GP4 indicates time t12. A state data set for play GP4 is transmitted to game terminal 200C in response to the second state request. Therefore, an end and a state of play GP4 performed at game terminal 200D (for example, the score and the name of a participant player) is notified to a participant player of play GP3 at game terminal 200C at time t13 (after a delay period has passed since time t12) during the game period of play GP3. According to this embodiment, even in a case in which a game period is long, a state of another play can be notified to a player using game terminal 200 throughout the game period. Furthermore, a delay period can be made shorter. Therefore, delivery of useless data can be reduced. As an alternative embodiment, the state request transmitter may transmit a second state request to communication apparatus 300 after a period of time elapsed since transmitting a state request to the communication apparatus exceeds the delay period.

As another embodiment, the apparatus state writer of communication apparatus 300, when an end notification is received by the end notification receiver, may write a state data set in association with a game terminal which has transmitted the end notification into the apparatus data storage unit, the state data set including a play data item indicating a state of a play for which the end is indicated by the received end notification and a time data item indicating a point in time at which this end notification was received. The state transmitter of communication apparatus 300, when a state request is received by the state request receiver, may read from the apparatus data storage unit a state data set that is not linked to the game terminal 200 which has transmitted the state request, for transmission to game terminal 200 having transmitted the received state request.

More specific description will be given of this modified embodiment. The end notification which game terminal 200 transmits to communication apparatus 300 after the end of the play process (Step SA7 in FIG. 6) is appended with designation information (for example, communication address) identifying game terminal 200 having transmitted the end notification. Processor 330 of communication apparatus 300, upon executing a receiving process of the end notification, generates state data set 254 (Step SB3 in FIG. 7). Specifically, processor 330 generates state data set 254 that contains a play data item indicating a state of a play for which the end is indicated by the received end notification and a time data item indicating the current time (a point in time at which the end notification was received). Subsequently, processor 330 (the apparatus state writer) writes the generated state data set 254 into volatile area 325 in correlation with the designation information identifying game terminal 200 having transmitted the end notification (Step SB4).

In Step SA2 in FIG. 6, designation information (for example, a communication address) is also appended to a state request which game terminal 200 transmits to the communication apparatus, the designation information identifying game terminal 200 which has transmitted the state request. Processor 330 of communication apparatus 300, upon executing a receiving process of a state request, reads a state data set from volatile area 325 (the apparatus data storage unit) (Step SC3 in FIG. 8). Specifically, processor 330 (the state transmitter) reads, from volatile area 325, a state data set that includes a time data item indicating a point in time during the above period for transmission and that is not linked with designation information identifying game terminal 200 which has transmitted the state request. Subsequently, processor 330, in cooperation with communication interface 310 (the state transmitter), transmits the read state data set to the transmitter of the state request received in Step SC2 (Step SC4). In this embodiment, a game terminal which has transmitted a state request, does not receive a state data set for a play performed at this transmitter game terminal, but can receive a state data set for a play performed at another game terminal. Therefore, a player who uses a game terminal that has transmitted a state request is not notified of a state data set for a play performed at this transmitter game terminal.

As another embodiment, communication apparatus 300 has, for each play, a terminal-player link data memory for storing a terminal-player link data set describing a link between a player participating in the play and game terminal 200 executing the play, and the apparatus state writer of communication apparatus 300, when an end notification is received by the end notification receiver, may refer to the terminal-player link data memory to write a state data set into the apparatus data storage unit in a manner in which the state data set is linked with a player that is linked with game terminal 200 which has transmitted the end notification, the state data set including a play data item indicating a state of a play for which the end is indicated by the received end notification and a time data item indicating a point in time at which the end notification was received. The state transmitter of communication apparatus 300, when a state request is received by the state request receiver, may refer to the terminal-player link data memory and read from the apparatus data storage unit a state data set that is not linked with a player linked with a game terminal which has transmitted the state request, for transmission to game terminal 200 which has transmitted the received state request.

More specific description will be given of this modified embodiment. In volatile area 325 (terminal-player link data memory) in storage device 320 of communication apparatus 300, there is stored, for each play, a terminal-player link data set describing a link between a player participating in the play and game terminal 200 executing the play. Game terminal 200 transmits to communication apparatus 300 a notification containing data representing designation information (for example, the name of a participant player) for identifying a participant player. This notification is appended with designation information (for example, a communication address) for identifying game terminal 200 which has transmitted the notification. For example, this notification may be included in the state request transmitted in Step SA2 in FIG. 6 or may be included in the end notification transmitted in Step SA7 in FIG. 6. Processor 330 of communication apparatus 300, upon receiving this notification, writes a terminal-player link data set that links designation information identifying a participant player represented by the notification with designation information identifying a game terminal which has transmitted the notification in volatile area 325.

As described above, an end notification which game terminal 200 transmits to communication apparatus 300 after the play process (Step SA7 in FIG. 6) represents designation information identifying a participant player of a play (for example, the name of the participant player). Furthermore, the end notification is appended with designation information identifying game terminal 200 which has transmitted the end notification (for example, a communication address). Processor 330 of communication apparatus 300, upon executing a receiving process of the end notification, generates state data set 254 (Step SB3 in FIG. 7). Specifically, processor 330 generates state data set 254 including a play data item indicating a state of a play for which the end is indicated by the received end notification and a time data item indicating the current time (a point in time at which the end notification was received). Subsequently, processor 330 (the apparatus state writer) refers to the terminal-player link data set in volatile area 325 and writes the generated state data set 254 into volatile area 325 in a manner in which the state data set 254 is linked with designation information identifying a game terminal which has transmitted this end notification and with designation information identifying a player, the designation information of the player being linked, in the terminal-player link data set, with the designation information identifying the game terminal which has transmitted the end notification (Step SB4).

The state request which game terminal 200 transmits to the communication apparatus in Step SA2 in FIG. 6 also indicates designation information identifying game terminal 200 having transmitted the state request (for example, a communication address) and designation information identifying a participant player of the play (for example, the name of the participant player). Processor 330 of communication apparatus 300, upon executing a receiving process of the state request, refers to the terminal-player link data set in volatile area 325, to read a state data set from volatile area 325 (the apparatus data storage unit) (Step SC3 in FIG. 8). Specifically, processor 330 (the state transmitter) reads from volatile area 325 a state data set that includes a time data item indicating a point in time within the above period for transmission and that is not linked with designation information identifying a game terminal that has transmitted the state request or designation information identifying a player, the designation of the player being linked, in the terminal-player link data set, with the designation information identifying the transmitter game terminal. Subsequently, processor 330 in cooperation with communication interface 310 (the state transmitter) transmits the read state data set to the transmitter of the state request received in Step SC2 (Step SC4). In this embodiment, a game terminal which has transmitted a state request can receive a state data set for a play by a player other than a player currently participating in a play by using the game terminal. In this embodiment, even if a player has used the same game terminal in the past, a state data set by another player is transmitted to a game terminal which has transmitted the state request. A player using a game terminal which has transmitted a state request is not notified of a state data set for a play performed by the same player.

As another embodiment, communication apparatus 300 may have a terminal-game place link data memory for storing, for each of plural game places in each of which at least one game terminal is located, a terminal-game place link data set describing a link between a game place and a game terminal located therein, and the apparatus state writer of communication apparatus 300, when an end notification is received by the end notification receiver, may refer to the terminal-game place link data memory and write a state data set in the apparatus data storage unit in correlation with game place 2 linked with game terminal 200 which has transmitted the end notification, the state data set including a play data item indicating a state of a play for which the end is indicated by the received end notification and a time data item indicating a point in time at which the end notification was received. The state transmitter of communication apparatus 300, when a state request is received by the state request receiver, may refer to the terminal-game place link data memory, read from the apparatus data storage unit a state data set that is not linked with game place 2 that is linked with game terminal 200 which has transmitted the state request, and transmit the read state data set to game terminal 200 that has transmitted the received state request.

More specific description will be given of this modified embodiment. There is stored in volatile area 325 or nonvolatile area 326 (terminal-game place link data memory) in storage device 320 of communication apparatus 300, a terminal-game place link data set describing a link between a game place 2 and game terminal 200 located in game place 2. In a case in which the game place is a game arcade, a relationship between the name of a game arcade and a game terminal located in the game arcade, for example, is stored in the terminal-game place link data set. In a case in which a game place is a residential house and a communication address is fixedly allocated to a game terminal in the house, for example, a relationship between the LAN address of the house and the communication address of a game terminal in the house is stored in the terminal-game place link data set. In a case in which a game place is a residential house and a communication address is dynamically allocated to a game terminal in the house, for example when the game terminal and communication apparatus 300 starts communication with each other, the name or the communication address of the house LAN and the name or the communication address of the game terminal in the house are conveyed to communication apparatus 300, the relationship between the name or the communication address of the house LAN and the name or the communication address of the game terminal in the house is stored in the terminal-game place link data set.

The end notification which game terminal 200 transmits to communication apparatus 300 after the play process (Step SA7 in FIG. 6) is appended with designation information identifying game terminal 200 which has transmitted the end notification (for example, a communication address). Processor 330 of communication apparatus 300, upon executing a receiving process of the end notification, generates state data set 254 (Step SB3 in FIG. 7). Specifically, processor 330 generates state data set 254 including a play data item indicating a state of a play for which the end is indicated by the received end notification and a time data item indicating the current time (a point in time at which the end notification was received). Subsequently, processor 330 (the apparatus state writer) refers to the terminal-game place link data set in storage device 320 and writes the generated state data set 254 into volatile area 325 in such a manner that the generated state data set 254 is linked with designation information identifying a game place which is linked, in terminal-game place link data set, with designation information identifying a game terminal that has transmitted this end notification (Step SB4).

The state request which game terminal 200 transmits to the communication apparatus in Step SA2 in FIG. 6 also indicates designation information identifying game terminal 200 having transmitted the state request (for example, a communication address). Processor 330 of communication apparatus 300, upon executing a receiving process of the state request, refers to the terminal-game place link data set in storage device 320, to read a state data set from volatile area 325 (the apparatus data storage unit) (Step SC3 in FIG. 8). Specifically, processor 330 (the state transmitter) reads from volatile area 325 a state data set that includes a time data item indicating a point in time within the above period for transmission and that is not linked with designation information identifying a game place linked, in the terminal-game place link data set, with designation information identifying a game terminal that has transmitted the state request. Subsequently, processor 330 in cooperation with communication interface 310 (the state transmitter) transmits the read state data set to the transmitter of the state request received in Step SC2 (Step SC4). In this embodiment, a game terminal which has transmitted a state request can receive a state data set for a play performed at a game terminal in a game place other than the game place linked with the transmitter game terminal. That is, a state data set of a play in a game place where a game terminal having transmitted a state request is not located can be received. A player who is using a game terminal which has transmitted a state request is not notified of a state data set of a play performed by the player and performed by another player nearby.

As another embodiment, designation information (for example, names, nicknames, identification numbers) for identifying a player represented by a play data item may be stored in communication apparatus 300 in advance. This embodiment can be implemented by using a well-known game system for identifying a player with a card carried by each player. Furthermore, as an outputter for outputting information to the outside of game terminal 200, an outputter other than display unit 220 (for example, a blinking light source, and a speaker or other sound producing mechanism) may be used. Furthermore, as an inputter for receiving input of information from the outside of game terminal 200, an inputter other than operation unit 230 (for example, buttons, a keyboard, a touch panel) can be used. Also, the present invention can be applied to a freely-selected computer game other than a single player game.

Communication apparatus 300 of the embodiment is a single unit, but a communication apparatus may have plural units, for example, a unit for performing a storage process and another unit for performing a response process.

In the foregoing, a specific embodiment of the present invention has been described, but the present invention can also be implemented as a computer program including a sequence of machine-readable instructions describing the above disclosed method performed at each game terminal 200, a computer program including a sequence of machine-readable instructions describing the method performed at communication apparatus 300, or a program product that bears each of these computer programs. A "program product" may be a computer-readable information recording medium that has recorded therein the computer program or a data carrier for transmitting the computer program. The "information recording medium" can be, in addition to the above described example, various discs, tapes, chips, or sticks. The "data carrier" can be various types of networks regardless of whether it is wired or wireless. A format of a computer program may be compiled or not compiled.

The invention claimed is:

1. A game system having plural game terminals belonging to a network and a communication apparatus belonging to the network, each of the plural game terminals comprising:
    a play processor for performing a play of a computer game;
    an end notification transmitter for transmitting an end notification indicating an end and a state of the play when the play performed by the play processor ends;
    a terminal data storage unit for readably storing data written therein;
    a state request transmitter for transmitting, to the communication apparatus, a state request for requesting the communication apparatus to transmit a state data set, the state data set including a play data item and a time data item, with the play data item indicating a state of at least another play that has ended and the time data item indicating a point in time corresponding to a point in time at which the communication apparatus was notified of the end of the another play;

a state receiver for receiving the state data set from the communication apparatus;

a terminal state writer for, when the state data set is received by the state receiver, writing the received state data set into the terminal data storage unit;

a delay reader for reading from the terminal data storage unit the play data item of the state data set when a first period equal to a designated delay period has passed since the point in time indicated by the time data item within the state data set, and reading from the terminal data storage unit another play data item of another state data set when a second period equal to the designated delay period has passed since another point in time indicated by the another time data item within the another state data set; and an information outputter for, when the play data item is read by the delay reader, outputting information corresponding to the state of the play indicated by the play data item, the communication apparatus comprising:

an apparatus data storage unit for readably storing data written therein;

an end notification receiver for receiving an end notification, from one of the plural game terminals, the end notification notifying an end and a state of a play;

an apparatus state writer for, when the end notification is received by the end notification receiver, writing a state data set into the apparatus data storage unit, the state data set including a play data item and a time data item, with the play data item indicating a state of the play for which the end is indicated by the received end notification and the time data item indicating a point in time corresponding to a point in time at which the end notification was received;

a state request receiver for receiving the state request from one of the plural game terminals; and a state transmitter for transmitting the state data set to the game terminal which has transmitted the state request, after reading the state data set from the apparatus data storage unit when the state request is received by the state request receiver.

2. A game system according to claim 1, wherein the state request transmitter of each of the game terminals transmits, to the communication apparatus, the state request when a play is not being performed by the play processor.

3. A game system according to claim 1, wherein the state transmitter of the communication apparatus, in reading the state data set from the apparatus data storage unit, reads every state data set that includes the time data item indicating a point in time falling within a period equal to the delay period, which ends at the time of reading.

4. The game system according to claim 1, wherein each of the game terminals further comprises a delay period determiner for determining the delay period;

wherein the state request transmitter of each of the game terminals transmits the state request including a delay data item indicating the delay period determined by the delay period determiner; and wherein the state transmitter of the communication apparatus, in reading the state data set from the apparatus data storage unit, reads every state data set that includes the time data item indicating a point in time falling within a period equal to the delay period, which ends at the reading.

5. A game system according to claim 1, wherein the state request transmitter of each of the game terminals transmits another state request to the communication apparatus before a period of time elapsed since transmitting the state request to the communication apparatus exceeds the delay period.

6. A game system according to claim 1, wherein the apparatus state writer of the communication apparatus, when the end notification is received by the end notification receiver, writes the state data set into the apparatus data storage unit in a manner in which the state data set is linked with a game terminal which has transmitted the end notification, the state data set including a play data item and a time data item, with the play data item indicating a state of the play for which the end is indicated by the received end notification and the time data item indicating a point in time corresponding to a point in time at which the end notification was received; and wherein the state transmitter of the communication apparatus, when the state request is received by the state request receiver, reads from the apparatus data storage unit the state data set that is not linked with a game terminal which has transmitted the state request, the state transmitter transmitting the read state data set to the game terminal which has transmitted the state request.

7. A game system according to claim 1, wherein the communication apparatus further comprises a terminal-player link data memory for storing a terminal-player link data set for each play, the terminal-player link data set describing a link between a player participating in the play and the game terminal executing the play;

wherein the apparatus state writer of the communication apparatus, when the end notification is received by the end notification receiver, refers to the terminal-player link data memory and writes the state data set into the apparatus data storage unit in a manner in which the state data set is linked with a player linked with the game terminal which has transmitted the end notification, the state data set including the play data item and the time data item, with the play data item indicating a state of the play for which the end is indicated by the received end notification and the time data item indicating a point in time corresponding to a point in time at which the end notification was received; and wherein the state transmitter of the communication apparatus, when the state request is received by the state request receiver, refers to the terminal-player link data memory and reads from the apparatus data storage unit the state data set that is not linked with a player linked with the game terminal which has transmitted the state request, the state transmitter transmitting the state data set to the game terminal which has transmitted the state request.

8. A game system according to claim 1, wherein the communication apparatus further comprises a terminal-game place link data memory for storing a terminal-game place link data set for each of game places, in each of which at least one game terminal is located, the terminal-game place link data set describing a link between a game place and the game terminal in the game place;

wherein the apparatus state writer of the communication apparatus, when the end notification is received by the end notification receiver, refers to the terminal-game place link data memory and writes the state data set into the apparatus data storage unit in a manner in which the state data set is linked with a game place linked with the game terminal which has transmitted the end notification, the state data set including the play data item and the time data item, with the play data item indicating a state of the play of which the end is indicated by the received end notification and the time data item indicating a point in time corresponding to a point in time at which the end notification was received; and wherein the state transmitter of the communication apparatus, when the state request is received by the state request receiver, refers to the terminal-game place link data memory and reads from the apparatus data storage unit the state data set that is not linked with a game place linked with the game terminal which has transmitted the state request, the state transmitter transmitting the state data set to the game terminal which has transmitted the state request.

9. A game terminal belonging to a network to which a communication apparatus belongs and being capable of communicating with the communication apparatus, comprising: a play processor for performing a play of a computer game;

an end notification transmitter for transmitting an end notification indicating an end and a state of the play when the play performed by the play processor ends;

a terminal data storage unit for readably storing data written therein;

a state request transmitter for transmitting, to the communication apparatus, a state request for requesting the communication apparatus to transmit a state data set, the state data set including the play data item and the time data item, with the play data item indicating a state of at least another play that has ended and the time data item indicating a point in time corresponding to a point in time at which the communication apparatus was notified of the end of the another play;

a state receiver for receiving the state data set from the communication apparatus;

a terminal state writer for, when the state data set is received by the state receiver, writing the received state data set into the terminal data storage unit;

a delay reader for reading from the terminal data storage unit the play data item within the state data set when a first period equal to a designated delay period has passed since the point in time indicated by the time data item within the state data set, and reading from the terminal data storage unit another play data item of another state data set when a second period equal to the designated delay period has passed since another point in time indicated by another time data item within the another state data set;

and an information outputter for, when the play data item is read by the delay reader, outputting information corresponding to the state of the play indicated by the play data item.

10. A communication apparatus belonging to a network to which plural game terminals belong, each of the game terminals performing a play of a computer game, the communication apparatus being capable of communicating with each game terminal, comprising:

an apparatus data storage unit for readably storing data written therein;

an end notification receiver for receiving, from one of the plural game terminals, an end notification notifying an end and a state of a play;

an apparatus state writer for, when the end notification is received by the end notification receiver, writing a state data set into the apparatus data storage unit, the state data set including a play data item and a time data item, with the play data item indicating a state of the play for which the end is indicated by the received end notification and the time data item indicating a point in time corresponding to a point in time at which the end notification was received;

a state request receiver for receiving a state request from one of the plural game terminals, the state request requesting the communication apparatus to transmit the state data set;

and a state transmitter for transmitting the state data set to the game terminal which has transmitted the state request, after reading the state data set from the apparatus data storage unit when the state request is received by the state request receiver, wherein the play data item within the state data set is read when a first period equal to a designated delay period has passed since the point in time indicated by the time data item within the state data set, and another play data item of another state data set is read when a second period equal to the designated delay period has passed since another point in time indicated by another time data item within the another state data set.

11. A computer-readable storage medium having stored therein a computer program for use in a game terminal belonging to a network to which a communication apparatus belongs and being capable of communicating with the communication apparatus, the game terminal comprising a terminal data storage unit for readably storing data written therein, the computer program causing the game terminal to serve as: a play processor for performing a play of a computer game;

an end notification transmitter for transmitting an end notification indicating an end and a state of the play when the play performed by the play processor ends;

a state request transmitter for transmitting, to the communication apparatus, a state request for requesting the communication apparatus to transmit a state data set, the state data set including a play data item and a time data item, with the play data item indicating a state of at least another play that has ended and the time data item indicating a point in time corresponding to a point in time at which the communication apparatus was notified of the end of the another play;

a state receiver for receiving the state data set from the communication apparatus;

a terminal state writer for, when the state data set is received by the state receiver, writing the received state data set into the terminal data storage unit;

a delay reader for reading from the terminal data storage unit the play data item within the state data set when a first period equal to a designated delay period has passed since the point in time indicated by the time data item within the state data set, and reading from the terminal data storage unit another play data item of another state data set when a second period equal to the designated delay period has passed since another point in time indicated by another time data item within the another state data set;

and an information outputter for, when the play data item is read by the delay reader, outputting information corresponding to the state of the play indicated by the play data item.

12. A computer-readable storage medium having stored therein a computer program for use in a communication apparatus belonging to a network to which plural game terminals belong, each of the game terminals performing a play of a computer game, the communication apparatus being capable of communicating with each game terminal, the communication apparatus comprising an apparatus data storage unit for readably storing data written therein, the computer program causing the communication apparatus to serve as:

an end notification receiver for receiving, from one of the plural game terminals, an end notification notifying an end and a state of a play;

an apparatus state writer for, when the end notification is received by the end notification receiver, writing a state data set into the apparatus data storage unit, the state data set including a play data item and a time data item, with the play data item indicating a state of the play for which the end is indicated by the received end notification and the time data item indicating a point in time corresponding to a point in time at which the end notification was received;

a state request receiver for receiving a state request from one of the plural game terminals, the state request requesting the communication apparatus to transmit the state data set;

and a state transmitter for transmitting the state data set to the game terminal which has transmitted the state request, after reading the state data set from the apparatus data storage unit when the state request is received by the state request receiver, wherein the play data item within the state data set is read when a first period equal to a designated delay period has passed since the point in time indicated by the time data item within the state data set, and another play data item of another state data set is read when a second period equal to the designated delay period has passed since another point in time indicated by another time data item within the another state data set.

13. A data management method for use in a communication apparatus belonging to a network to which plural game terminals belong, each of the game terminals performing a play of a computer game, the communication apparatus being capable of communicating with each game terminal, and the communication apparatus comprising an apparatus data storage unit for readably storing data written therein, the data management method comprising:

receiving an end notification notifying an end and a state of a play from one of the plural game terminals;

writing a state data set into the apparatus data storage unit after the receiving of the end notification receiving, the state data set including a play data item and a time data item, with the play data item indicating a state of the play for which the end is indicated by the received end notification received and the time data item indicating a point in time corresponding to a point in time at which the end notification was received;

receiving a state request from one of the plural game terminals, the state request requesting the communication apparatus to transmit the state data set;

reading the state data set from the apparatus data storage unit after the receiving of the state request;

and transmitting the state data set to the game terminal which has transmitted the state request received, wherein the play data item within the state data set is read when a first period equal to a designated delay period has passed since the point in time indicated by the time data item within the state data set, and another play data item of another state data set is read when a second period equal to the designated delay period has passed since another point in time indicated by another time data item within the another state data set.

14. The game system of claim 1, wherein the communication apparatus selects the state data set that indicates a point in time within a period of time corresponding to a delay in transmission ending at a time when the state request was received.

15. The communication apparatus of claim 10, wherein the communication apparatus selects the state data set that indicates a point in time within a period of time corresponding to a delay in transmission ending at a time when the state request was received.

16. The computer readable medium of claim 12, wherein the communication apparatus selects the state data set that indicates a point in time within a period of time corresponding to a delay in transmission ending at a time when the state request was received.

17. The method of claim 13, wherein the communication apparatus selects the state data set that indicates a point in time within a period of time corresponding to a delay in transmission ending at a time when the state request was received.

* * * * *